(12) United States Patent
Terao et al.

(10) Patent No.: US 7,952,680 B2
(45) Date of Patent: May 31, 2011

(54) LIQUID CRYSTAL DEVICE AND ELECTRONIC APPARATUS

(75) Inventors: Koichi Terao, Suwa (JP); Takumi Seki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 243 days.

(21) Appl. No.: 12/422,534

(22) Filed: Apr. 13, 2009

(65) Prior Publication Data

US 2010/0007842 A1    Jan. 14, 2010

(30) Foreign Application Priority Data

Jul. 8, 2008  (JP) ................................. 2008-177604

(51) Int. Cl.
G02F 1/1339  (2006.01)
G02F 1/1341  (2006.01)
G02F 1/1343  (2006.01)
G02F 1/1333  (2006.01)

(52) U.S. Cl. ........................................ 349/153; 349/190

(58) Field of Classification Search .................. 349/139, 349/153, 154, 155, 156, 157, 189, 190
See application file for complete search history.

(56) References Cited

U.S. PATENT DOCUMENTS

| | | | |
|---|---|---|---|
| 6,251,000 B1 * | 6/2001 | Murakami et al. | 451/364 |
| 6,734,943 B2 * | 5/2004 | Noiri | 349/153 |
| 7,683,993 B2 * | 3/2010 | Ishitani | 349/139 |
| 7,705,957 B2 * | 4/2010 | Whitehead et al. | 349/153 |
| 2004/0141143 A1 * | 7/2004 | Lee et al. | 349/156 |
| 2006/0017876 A1 * | 1/2006 | Watts | 349/153 |
| 2006/0285055 A1 * | 12/2006 | Tanaka | 349/153 |
| 2007/0153211 A1 * | 7/2007 | Whitehead Jr. et al. | 349/153 |
| 2010/0134748 A1 * | 6/2010 | Ishitani | 349/153 |

FOREIGN PATENT DOCUMENTS

| | | |
|---|---|---|
| JP | 09-127528 A | 5/1997 |
| JP | 10-123537 A | 5/1998 |
| JP | 11-109388 A | 4/1999 |
| JP | 2001-066612 A | 3/2001 |
| JP | 2001-264775 A | 9/2001 |
| JP | 2002-350874 A | 12/2002 |
| JP | 2004-094072 A | 3/2004 |
| JP | 2004-133194 A | 4/2004 |
| JP | 2004-272086 A | 9/2004 |
| JP | 2004-279780 A | 10/2004 |
| JP | 2006-030439 A | 2/2006 |
| JP | 2006-258971 A | 9/2006 |
| JP | 2007-187866 A | 7/2007 |
| JP | 2007-304273 A | 11/2007 |

* cited by examiner

*Primary Examiner* — Akm E Ullah

(74) *Attorney, Agent, or Firm* — Lowe, Hauptman, Ham & Berner, LLP

(57) ABSTRACT

A liquid crystal device including: a first partition wall which is disposed on the first substrate at the second substrate side, is adjacent to the liquid crystal at one wall surface, is adjacent to the seal material at the other wall surface, and is disposed along the outer circumference of the display region; a second partition wall which is disposed on the first substrate at the second substrate side, has a wall surface facing the wall surface of the first partition wall adjacent to the seal material, and is disposed along the outer circumference of the first partition wall; and a connection portion which is disposed on the first substrate at the second substrate side with a height lower than that of the first partition wall and the second partition wall, and is disposed so as to connect the wall surface of the first partition wall adjacent to the seal material and the wall surface of the second partition wall facing the wall surface.

23 Claims, 26 Drawing Sheets

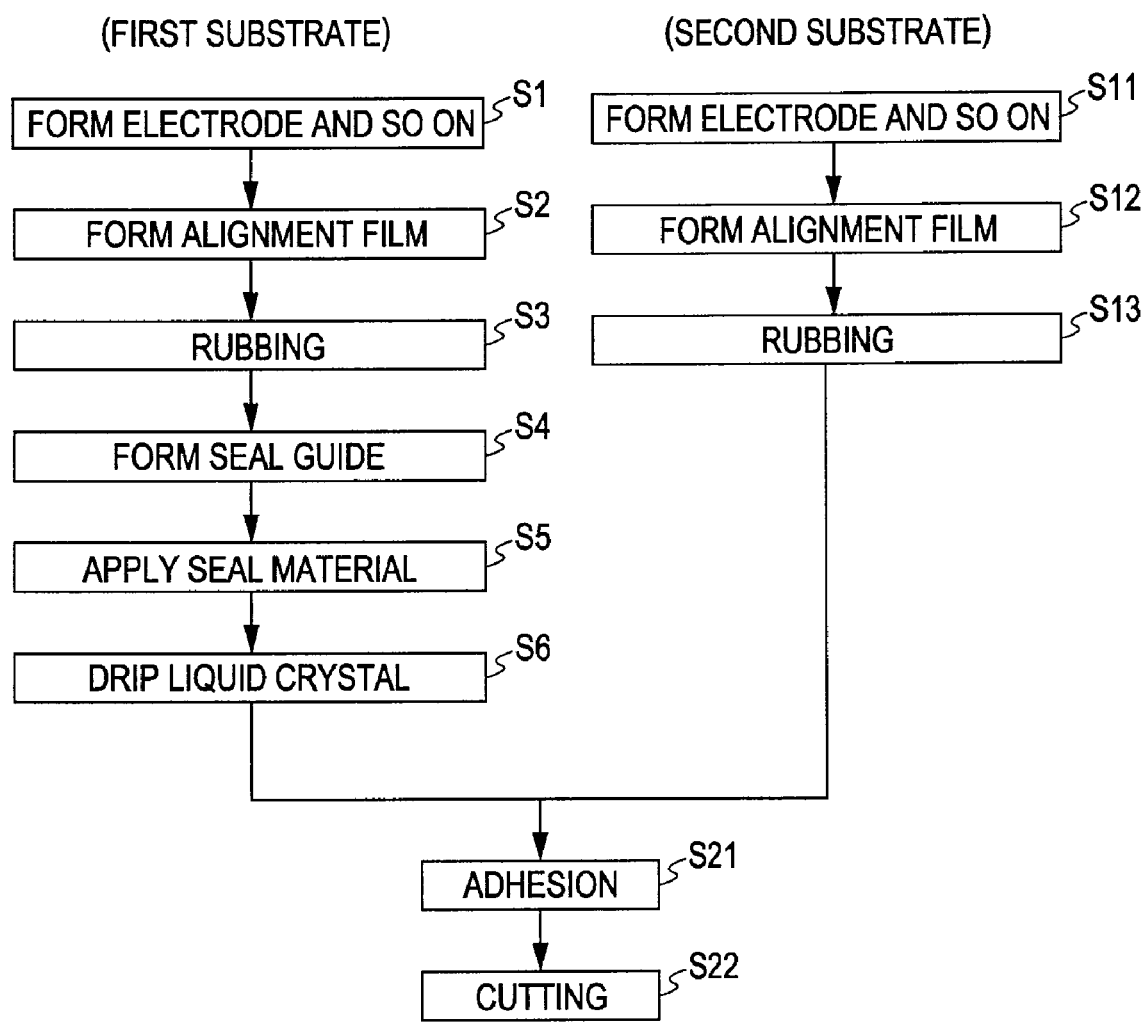

LIQUID CRYSTAL DEVICE AND ELECTRONIC APPARATUS

RELATED APPLICATIONS

The present application is based on, and claims priority from Japanese Application Number 2008-177604, filed Jul. 8, 2008, the disclosure of which is hereby incorporated by reference herein in its entirety.

BACKGROUND

1. Technical Field

The present invention relates to a liquid crystal device and an electronic apparatus including the liquid crystal device.

2. Related Art

A liquid crystal device is formed by adhering a pair of substrates formed of a light transmission material by a sealing material and charging liquid crystal in a gap (cell gap) between such substrates. Examples of a method of charging liquid crystal in a cell gap include a vacuum injection method and a dripping injection method.

The vacuum injection method is a method of adhering a pair of substrates except a liquid crystal injection hole and, thereafter, evacuating the inside of the cell gap so as to inject liquid crystal from the liquid crystal injection hole by a pressure difference. In this method, while the liquid crystal device is enlarged, a liquid crystal injection time is increased.

The dripping injection method which is recently used is a method of applying a frame-shaped sealing material on the surface of one of a pair of substrates which face each other so as to surround a liquid crystal display region, dripping liquid crystal in the frame of the sealing material, just thereafter, overlapping the other substrate, and curing the sealing material so as to perform sealing. In this method, a liquid crystal injection time is shorter than that of the vacuum injection method.

Meanwhile, in this dripping injection method, by the contact between the uncured sealing material and the liquid crystal, resin or additive components contained in the seal material are eluted in the liquid crystal, the liquid crystal is contaminated, and the deterioration of the display quality of the liquid crystal device, such as display unevenness or alignment abnormality, occurs.

In order to solve this problem, in JP-A-2006-30439, an annular partition wall having the same height as a gap between substrates is formed on one substrate, a seal material (sealing material) is applied in an annular groove provided in the partition wall, and the other substrate is adhered, such that the seal material is prevented from being penetrated into the liquid crystal injection side.

However, in the structure of the dripping injection method of JP-A-2006-30439, when the substrates are adhered, the seal material may flow from the partition wall so as to overhang to the liquid crystal injection side, and the uncured seal material and the liquid crystal may be brought into contact with each other.

In the dripping injection method and the vacuum injection method, even in the seal material which overhangs to the liquid crystal injection side and is cured, if the curing operation is insufficient or with the elapse of time, resin or additive components contained in the seal material may be eluted little by little in the contract portion between the cured seal material and the liquid crystal, and thus the liquid crystal may be contaminated.

SUMMARY

The invention is to solve at least a portion of the problems, and the following aspects or application examples can be realized.

According to an aspect of the invention, there is provided a liquid crystal device in which a first substrate and a second substrate facing each other are adhered by a seal material, and liquid crystal is sandwiched between the first substrate and the second substrate in a region surrounded by the seal material so as to configure a display region in the region, the liquid crystal device including: a first partition wall which is disposed on the first substrate at the second substrate side, is adjacent to the liquid crystal at one wall surface, is adjacent to the seal material at the other wall surface, and is disposed along the outer circumference of the display region; a second partition wall which is disposed on the first substrate at the second substrate side, has a wall surface facing the wall surface of the first partition wall adjacent to the seal material, and is disposed along the outer circumference of the first partition wall; and a connection portion which is disposed on the first substrate at the second substrate side with a height lower than that of the first partition wall and the second partition wall, and is disposed so as to connect the wall surface of the first partition wall adjacent to the seal material and the wall surface of the second partition wall facing the wall surface, wherein a concave groove portion is configured by the first partition wall, the second partition wall and the connection portion, and the seal material is filled in the groove portion such that the first substrate and the second substrate are adhered.

By this configuration, the connection portion for connecting the first partition wall and the second partition wall formed on the first substrate is formed, and the seal material is disposed in the groove portion defined by the first partition wall, the second partition wall and the connection portion such that the first substrate and the second substrate are adhered.

Since the connection portion for connecting the first partition wall and the second partition wall is formed, the groove portion in which the seal material is disposed becomes shallow. Accordingly, it is possible to reduce the disposed amount of seal material and to reduce the amount of seal material which overhangs from the first partition wall to the injection side of the liquid crystal.

The first partition wall and the second partition wall are reinforced by the connection portion such that the collapse of the first partition wall and the second partition wall due to external force applied when rubbing and aligning process of the substrate is performed or when the substrates are adhered is prevented. Accordingly, it is possible to reduce the amount of seal material which overhangs from the first partition wall to the injection side of the liquid crystal.

Accordingly, since the amount of seal material which overhangs to the injection side of the liquid crystal is reduced and the elution of resin or additive components contained in the seal material due to the contact with the liquid crystal is remarkably reduced, the deterioration of the display quality of the liquid crystal device, such as display unevenness, alignment abnormality or the like, can be prevented.

In the liquid crystal device, a surface configuring the groove portion of the connection portion may be recessed toward the first substrate in an arc shape.

By this configuration, the large surface area of the groove portion can be secured while restricting the amount of seal material disposed in the groove portion and the adhesion strength of the first substrate and the second substrate can be improved.

In the liquid crystal device, irregularities may be formed in a surface configuring the groove portion of the connection portion.

By this configuration, by forming the irregularities in the surface of the connection portion, the large surface area of the groove portion can be secured and the adhesion strength of the first substrate and the second substrate can be improved.

In the liquid crystal device, the groove portion may be formed in an annular shape.

By this configuration, since a dripping injection method of the liquid crystal can be employed, the amount of seal material which overhangs to the injection side of the liquid crystal can be reduced and the contact between the liquid crystal and the uncured seal material can be reduced.

In the liquid crystal device, the seal material may be formed of a material selected from photo curing resin, thermosetting resin or photo-thermosetting resin.

By this configuration, since the seal material can be held in the groove portion, the seal material formed of photo curing resin, thermosetting resin, or photo-thermosetting resin may be used without depending on the viscosity of the seal material. Accordingly, the selection range of the seal material is increased and a seal material suitable for the use may be used.

In the liquid crystal device, the first partition wall, the second partition wall and the connection portion may be formed of a material selected from photo curing resin, thermosetting resin or photo-thermosetting resin.

By this configuration, since the photo curing resin, the thermosetting resin or the photo-thermosetting resin can be used, it is possible to easily form the first partition wall, the second partition wall and the connection portion.

In the liquid crystal device, the material of the first partition wall, the second partition wall and the connection portion may include a light absorption agent or a coloring pigment.

By this configuration, since the material forming the first partition wall, the second partition wall and the connection portion includes the light absorption agent or the coloring pigment, when light such as ultraviolet rays is irradiated in the curing of the seal material, the light absorption agent or the coloring pigment absorbs the light so as to prevent the light from being externally leaked. For example, in the dripping injection method of the liquid crystal, it is possible to prevent the liquid crystal from deteriorating due to the light leaked when the seal material formed of the photo curing resin or the photo-thermosetting resin is cured.

According to another aspect of the invention, there is provided a liquid crystal device in which a first substrate and a second substrate facing each other are adhered by a seal material, and liquid crystal is sandwiched between the first substrate and the second substrate in a region surrounded by the seal material so as to configure a display region in the region, the liquid crystal device including: a first partition wall which is disposed on the first substrate at the second substrate side, is adjacent to the liquid crystal at one wall surface, is adjacent to the seal material at the other wall surface, and is disposed along the outer circumference of the display region; and a second partition wall which is disposed on the first substrate at the second substrate side and has a wall surface facing the wall surface of the first partition wall adjacent to the seal material, and of which at least a portion is disposed with a height lower than that of the first partition wall along the outer circumference of the first partition wall, wherein the seal material is filled between the first partition wall and the second partition wall, such that the first substrate and the second substrate are adhered.

By this configuration, the first partition wall and the second partition wall at the outside thereof are formed on the first substrate and at least a portion of the second partition wall is formed with a height lower than that of the first partition wall. The seal material is disposed in the groove portion between the first partition wall and the second partition wall such that the first substrate and the second substrate are adhered.

Since at least the portion of the second partition wall is formed with the height lower than that of the first partition wall, the redundant seal material overhangs at the portion of the second partition wall having the low height when the first substrate and the second substrate are adhered. That is, the amount of seal material which overhangs from the first partition wall to the injection side of the liquid crystal can be reduced.

Accordingly, since the amount of seal material which overhangs to the injection side of the liquid crystal is reduced and the elution of the resin or additive components contained in the seal material due to the contact with the liquid crystal can be remarkably reduced, the deterioration of the display quality of the liquid crystal device, such as display unevenness, alignment abnormality or the like, can be prevented.

The liquid crystal device may further include a connection portion which connects the first partition wall and the second partition wall.

By this configuration, the first partition wall and the second partition wall are reinforced by the connection portion such that the elapse and the peeling of the first partition wall and the second partition wall can be prevented. In addition, since the depth of the groove portion formed between the first partition wall and the second partition wall can be reduced, it is possible to reduce the disposed amount of seal material, and to reduce the amount of seal material which overhangs from the first partition wall to the injection side of the liquid crystal and the amount of seal material which overhangs from the second partition wall.

In the liquid crystal device, a groove portion, in which the seal material is filled, may be formed in an annular shape.

By this configuration, since the dripping injection method of the liquid crystal can be employed, the amount of seal material which overhangs to the injection side of the liquid crystal can be reduced and the contact between the liquid crystal and the uncured seal material can be reduced.

In the liquid crystal device, the seal material may be formed of a material selected from photo curing resin, thermosetting resin or photo-thermosetting resin.

By this configuration, since the seal material can be held in the groove portion, the seal material formed of photo curing resin, thermosetting resin, or photo-thermosetting resin may be used without depending on the viscosity of the seal material. Accordingly, the selection range of the seal material is increased and a seal material suitable for the use may be used.

In the liquid crystal device, the first partition wall and the second partition wall may be formed of a material selected from photo curing resin, thermosetting resin or photo-thermosetting resin.

By this configuration, since the photo curing resin, the thermosetting resin or the photo-thermosetting resin can be used, it is possible to easily form the first partition wall, the second partition wall and the connection portion.

In the liquid crystal device, the material of the first partition wall and the second partition wall may include a light absorption agent or a coloring pigment.

By this configuration, since the photo curing resin, the thermosetting resin or the photo-thermosetting resin forming the first partition wall, the second partition wall and the connection portion includes the light absorption agent or the coloring pigment, when light such as ultraviolet rays is irradiated in the curing of the resin, the light absorption agent or the coloring pigment absorbs the light so as to prevent the light from being externally leaked. For example, in the dripping injection method of the liquid crystal, it is possible to prevent the liquid crystal from deteriorating due to the light leaked when the resin is cured.

According to another aspect of the invention, there is provided a liquid crystal device in which a first substrate and a second substrate facing each other are adhered by a seal material, and liquid crystal is sandwiched between the first substrate and the second substrate in a region surrounded by the seal material so as to configure a display region in the region, the liquid crystal device including: a first partition wall which is extended from one surface of the first substrate in the thickness direction of the first substrate and is formed along the outer circumference of the display region; a second partition wall which is extended from one surface of the first substrate in the thickness direction of the first substrate and is formed along the outer circumference of the first partition wall; and a third partition wall which is extended from one surface of the second substrate in the thickness direction of the second substrate, has a wall surface adjacent to the liquid crystal or the seal material, and is formed along the outer circumference of the display region, wherein the seal material is filled between the first partition wall and the second partition wall, such that the first substrate and the second substrate are adhered.

By this configuration, the third partition wall is formed on the second substrate. It is possible to prevent the seal material from overhanging to the liquid crystal side when the third partition wall is adjacent to the liquid crystal and to increase the adhesion area of the seal material so as to improve the adhesion strength of the first substrate and the second substrate when the third partition wall is adjacent to the seal material.

In the liquid crystal device, the wall surface of the third partition wall may be disposed so as to be in contact with the wall surface of the first partition wall.

By this configuration, the first partition wall and the second partition wall at the outside thereof are formed on the first substrate and the third partition wall is formed on the second substrate. At the adhesion position of the first substrate and the second substrate, the third partition wall is disposed at a position which is in contact with the first partition wall, and the seal material is disposed in the groove portion such that the first substrate and the second substrate are adhered.

The seal material which overhangs from the first partition wall to the liquid crystal injection side is held between the first partition wall and the third partition wall, and the amount of seal material which can be brought into contact with the liquid crystal can be reduced.

Accordingly, the amount of seal material which can be brought into contact with the liquid crystal is reduced and the elution of the resin or additive components contained in the seal material due to the contact with the liquid crystal can be remarkably reduced, the deterioration of the display quality of the liquid crystal device, such as display unevenness, alignment abnormality or the like, can be prevented.

In the invention, the contact includes the state in which a gap for holding the seal material is formed between the first partition wall and the third partition wall.

The liquid crystal device may further include a fourth partition wall which is extended from one surface of the second substrate in the thickness direction of the second substrate and is formed along the outer circumference of the third partition wall, and, at the adhesion position of the first substrate and the second substrate, the fourth partition wall may be disposed at a position which is in contact with the second partition wall.

By this configuration, since the fourth partition wall is disposed at the position which is in contact with the second partition wall, the seal material which overhangs between the second partition wall and the fourth partition wall can be held and thus the adhesion strength of the first substrate and the second substrate can be improved.

According to another aspect of the invention, there is provided a liquid crystal device in which a first substrate and a second substrate facing each other are adhered by a seal material, and liquid crystal is sandwiched between the first substrate and the second substrate in a region surrounded by the seal material so as to configure a display region in the region, the liquid crystal device including: a first partition wall which is disposed on the first substrate at the second substrate side, is adjacent to the liquid crystal at one wall surface, is adjacent to the seal material at the other wall surface, and is disposed along the outer circumference of the display region; a second partition wall which is disposed on the first substrate at the second substrate side, has a wall surface facing the wall surface of the first partition wall adjacent to the seal material, and is disposed along the outer circumference of the first partition wall; and a connection portion which is disposed on the second substrate at the first substrate side, and is fitted so as to connect the wall surface of the first partition wall adjacent to the seal material and the wall surface of the second partition wall facing the wall surface, wherein the seal material is filled in a region surrounded by the first partition wall, the second partition wall and the connection portion, such that the first substrate and the second substrate are adhered.

By this configuration, the connection portion which is fitted so as to connect the wall surface of the first partition wall and the wall surface of the second partition wall is disposed on the second substrate. Since this connection portion is disposed to cover the groove portion in which the seal material is filled, it is possible to prevent the seal material from overhanging to the liquid crystal side. In addition, the connection portion can increase the adhesion area of the seal material so as to improve the adhesion strength of the first substrate and the second substrate.

In the liquid crystal device, a groove portion, in which the seal material is filled, may be formed in an annular shape.

By this configuration, since the dripping injection method of the liquid crystal can be employed, the amount of seal material which overhangs to the injection side of the liquid crystal can be reduced and the contact between the liquid crystal and the uncured seal material can be reduced.

In the liquid crystal device, the seal material may be formed of a material selected from photo curing resin, thermosetting resin or photo-thermosetting resin.

By this configuration, since the seal material can be held in the groove portion, the seal material formed of photo curing resin, thermosetting resin, or photo-thermosetting resin may be used without depending on the viscosity of the seal material. Accordingly, the selection range of the seal material is increased and a seal material suitable for the use may be used.

In the liquid crystal device, the first partition wall and the second partition wall may be formed of a material selected from photo curing resin, thermosetting resin or photo-thermosetting resin.

By this configuration, since the photo curing resin, the thermosetting resin or the photo-thermosetting resin can be used, it is possible to easily form the first partition wall, the second partition wall and the connection portion.

In the liquid crystal device, the material of the first partition wall and the second partition wall may include a light absorption agent or a coloring pigment.

By this configuration, since the photo curing resin, thermosetting resin, or photo-thermosetting resin forming the first partition wall, the second partition wall and the connection portion includes the light absorption agent or the coloring pigment, when light such as ultraviolet rays is irradiated in the curing of the resin, the light absorption agent or the coloring pigment absorbs the light so as to prevent the light from being externally leaked. For example, in the dripping injection method of the liquid crystal, it is possible to prevent the liquid crystal from deteriorating due to the light leaked when the resin is cured.

According to another aspect of the invention, there is provided an electronic apparatus including any one of the above-described liquid crystal devices.

The electronic apparatus having this configuration includes the liquid crystal device capable of remarkably reducing the elution of resin or additive components contained in the seal material to the liquid crystal and preventing the deterioration of the display quality of the liquid crystal device, such as display unevenness, alignment abnormality or the like. Accordingly, it is possible to provide an electronic apparatus with excellent display quality.

BRIEF DESCRIPTION OF THE DRAWINGS

The invention will be described with reference to the accompanying drawings, wherein like numbers reference like elements.

FIG. 1 is a view showing the configuration of a liquid crystal device according to a first embodiment of the invention, wherein

FIG. 4 is a flowchart explaining a method of manufacturing the liquid crystal device according to the first embodiment of the invention.

FIG. 9 is a view showing the configuration of a liquid crystal device according to a second embodiment of the invention, wherein

FIG. 10 is an explanation view explaining the details of a seal guide according to the second embodiment of the invention, wherein

FIG. 12 is a view showing the configuration of another seal guide according to the second embodiment of the invention, wherein

FIG. 13 is a view showing the configuration of a liquid crystal device according to a third embodiment of the invention, wherein

FIG. 14 is an explanation view explaining the details of a seal guide according to the third embodiment of the invention, wherein

FIG. 22 is a view showing the configuration of a liquid crystal device according to a fourth embodiment of the invention, wherein

DESCRIPTION OF EXEMPLARY EMBODIMENTS

Hereinafter, the embodiments of the invention will be described with reference to the accompanying drawings. In each view used for following description, the scale of each member is properly changed in order that each member has a size capable of being identified in the view.

First Embodiment

Liquid Crystal Device 1

Figure 1A:
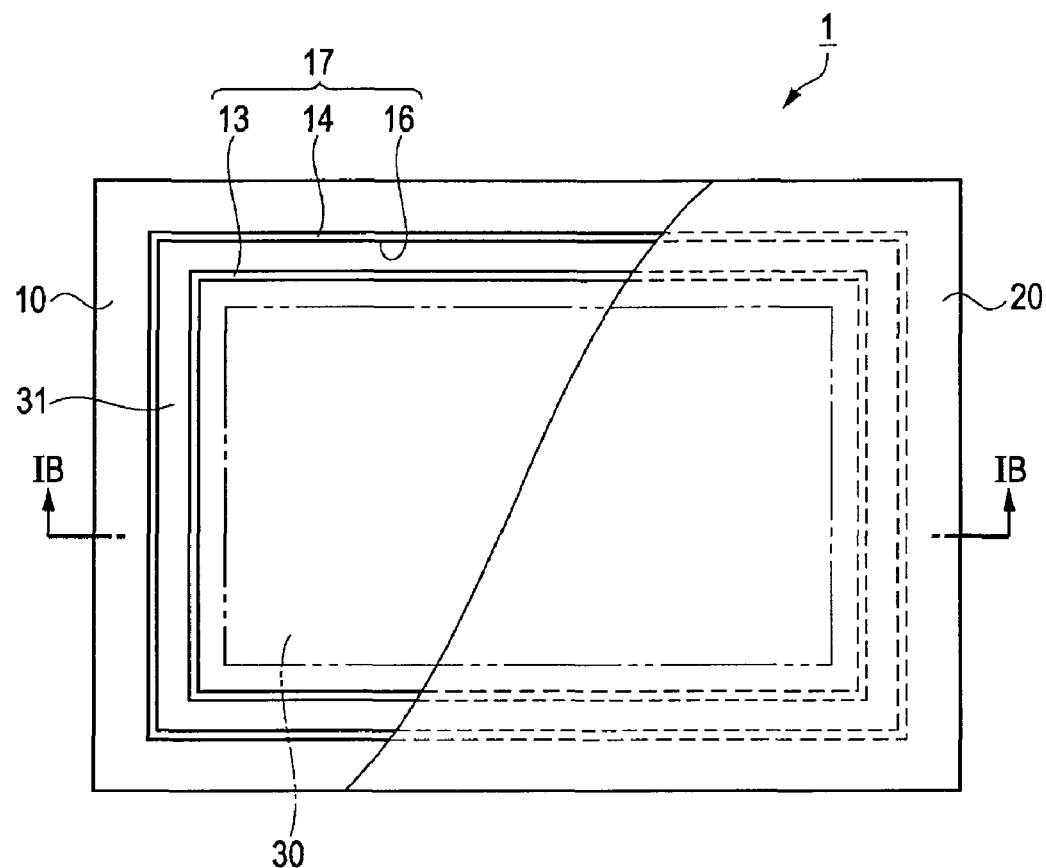
FIG. 1A is a schematic plan view and FIG. 1B is a schematic cross-sectional view taken along line IB-IB of FIG. 1A.
Figure 1B:
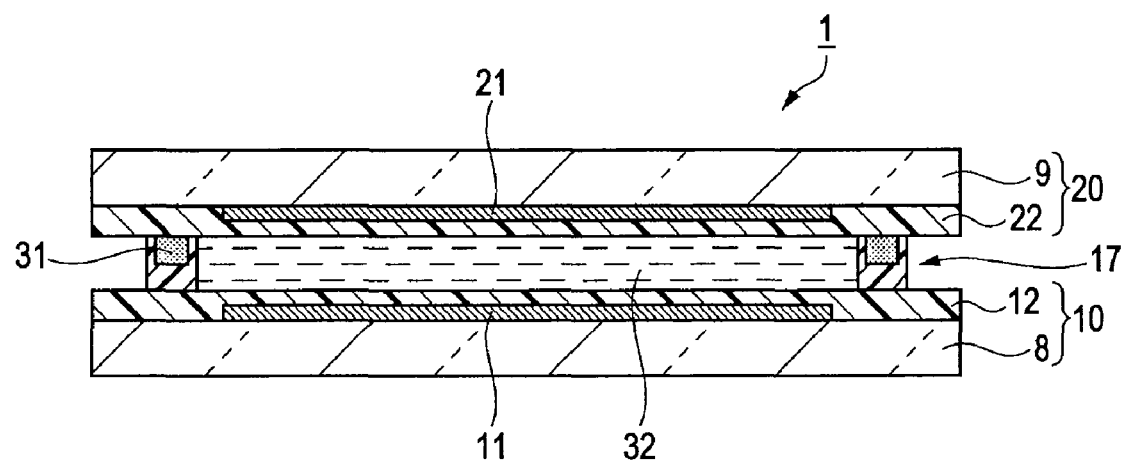
Figure 2:
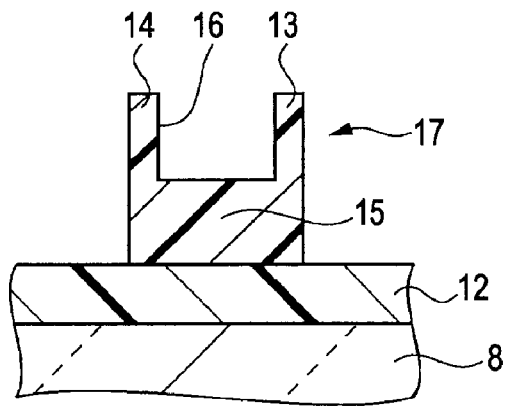
FIG. 2 is a schematic cross-sectional view showing the details of a seal guide according to the first embodiment of the invention.

FIG. 1 is a view showing the configuration of a liquid crystal device according to a first embodiment of the invention, wherein FIG. 1A is a schematic plan view and FIG. 1B is a schematic cross-sectional view taken along line IB-IB of FIG. 1A. FIG. 2 is a schematic cross-sectional view showing the details of a seal guide according to the first embodiment of the invention.

As shown in FIG. 1, the liquid crystal device 1 is integrated by adhering a first substrate (front side substrate) 10 and a second substrate (rear side substrate) 20 by a seal material 31 with liquid crystal 32 interposed therebetween. The first substrate 10 and the second substrate 20 which face each other are adhered by the seal material 31, and the liquid crystal 32 is sandwiched in a region surrounded by the seal material 31 between the first substrate 10 and the second substrate 20, thereby configuring a display region 30 in the region. In addition, the seal material 31 is held by a seal guide 17 provided in the edges of the first substrate 10 in an annular shape.

The first substrate 10 includes a first base material 8, a front electrode 11, an alignment film 12 and so on. The light transmission front electrode 11 is formed on one surface of the first base material 8 formed of a light transmission material such as glass, plastic or the like, and the alignment film 12 for controlling the alignment of the liquid crystal is formed thereon.

Similarly, the second substrate 20 includes a second base material 9, a rear electrode 21, an alignment film 22 and so on. The light transmission rear electrode 21 is formed on one surface of the second base material 9 formed of a light transmission material such as glass, plastic or the like, and the alignment film 22 for controlling the alignment of the liquid crystal is formed thereon.

On the alignment film 12 of the first substrate 10, the annular seal guide 17 is extended in a thickness direction of the first substrate 10 and is formed along the outer circumference of the display region 30.

As shown in FIGS. 1 and 2, the seal guide 17 includes a first partition wall 13, a second partition wall 14 and a connection portion 15. The first partition wall 13 extends in the thickness direction of the first substrate 10 so as to surround the outer circumference of the display region 30. In addition, the first partition wall 13 is adjacent to the liquid crystal 32 at one wall surface and is adjacent to the seal material 31 at the other wall surface. The second partition wall 14 extends in the thickness direction of the first substrate 10 so as to surround the outer circumference of the first partition wall 13. In addition, the second partition wall 14 has a wall surface which faces the wall surface of the first partition wall 13 adjacent to the seal material 31. The first partition wall 13 and the second partition wall 14 are formed with the same height so as to define a cell gap between both substrates. The connection portion 15 which connects the first partition wall 13 and the second partition wall 14 and is formed with a height lower than such partition walls is provided. In such a configuration, a groove portion 16 which uses the first partition wall 13 and the second partition wall 14 as sidewalls and uses the connection portion 15 as a bottom is defined in the seal guide 17. By adjusting the height of this connection portion 15, the depth of the groove portion 16 is properly adjusted.

In addition, a minimum dimension of the dimension (seal line width) of the outer sidewall of the first partition wall 13 and the outer sidewall of the second partition wall 14 of the seal guide 17 is set to 100 μm order (200 to 300 μm). In addition, the dimension of the inner sidewall of the first partition wall 13 and the inner sidewall of the second partition wall 14 is properly set to 50 μm to 2000 μm.

The seal material 31 is disposed in the groove portion 16 so as to adhere the first substrate 10 and the second substrate 20 with the liquid crystal 32 interposed therebetween.

Since the depth of the groove portion 16 can be properly adjusted by adjusting the height of the connection portion 15, the amount of the seal material 31 disposed in the groove portion 16 is set small. In addition, the first partition wall 13 and the second partition wall 14 can be reinforced by the connection portion 15 such that the collapse of the first partition wall 13 and the second partition wall 14 can be prevented when external force is applied. Accordingly, it is possible to reduce the amount of seal material 31 which overhangs from the first partition wall 13 to the injection side of the liquid crystal 32.

As the material of the seal material 31, photo curing epoxy resin, photo curing acrylic resin, thermosetting epoxy resin, photo-thermosetting epoxy acrylate resin, two liquid type epoxy resin or the like may be used.

In addition, as the material of the seal guide 17, photosensitive epoxy resin, photosensitive polyimide resin, photosensitive acrylic resin or the like may be used. As the material of the seal guide 17, an inorganic insulating film such as a silicon oxide film, a silicon nitride film or the like may be used.

In addition, a spacer may be added to the seal guide 17 or the seal material 31. If so, it is easy to control the cell gap.

Method of Manufacturing Liquid Crystal Device 1

Next, an example of the method of manufacturing the liquid crystal device 1 according to the present embodiment will be described.

Figure 3:
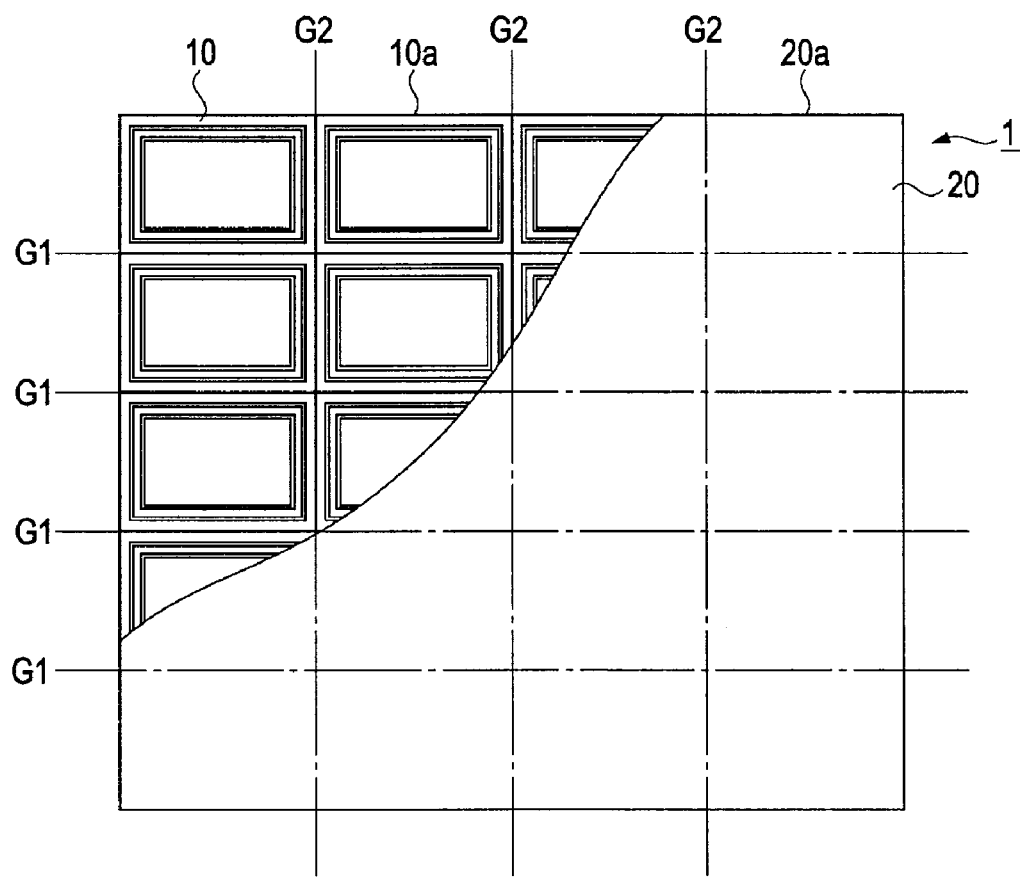
FIG. 3 is an explanation view showing a multiple-production state of the liquid crystal device according to the first embodiment of the invention.

FIG. 3 is an explanation view showing a multiple-production state of the liquid crystal device, FIG. 4 is a flowchart explaining the method of manufacturing the liquid crystal device, and FIGS. 5 and 6 are explanation views explaining the method of manufacturing the liquid crystal device.

As shown in FIG. 3, when the liquid crystal device is manufactured, a method of collectively forming a plurality of liquid crystal devices using a large-sized base material called a mother substrate (this method is also called a "multiple-production" method) is employed. In this method, in order to product a plurality of first substrates 10 of the liquid crystal devices 1, a first mother substrate 10a on which electrodes or wires are collectively formed is used and, in order to product a plurality of second substrates 20 of the liquid crystal devices 1, a second mother substrate 20a on which electrodes or wires are collectively formed is used.

In addition, the first mother substrate 10a and the second mother substrate 20a are adhered to each other with the liquid crystal interposed therebetween and are cut along scribe lines G1 and G2 so as to be divided into the liquid crystal devices 1.

Hereinafter, the manufacturing method will be described in detail using FIGS. 5 and 6 according to the flowchart of FIG. 4. In addition, one of the liquid crystal devices obtained by the multiple production will be shown and described.

Figure 5A:
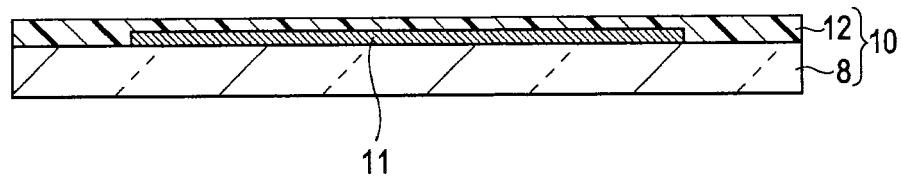
FIG. 5 is an explanation view explaining the method of manufacturing the liquid crystal device according to the first embodiment of the invention.

As shown in FIG. 5A, the front electrode 11, a wire and so on are formed on the surface of the first base material 8 formed of the light transmission material such as glass, plastic or the like (step S1). The front electrode 11 and the wire are formed by sputtering a light transmission conductive film such as indium tin oxide (ITO) or the like on one surface of the first base material 8 and etching the light transmission conductive film. Next, the alignment film 12 is formed on the front electrode 11 (step S2). The alignment film 12 is formed by applying or printing, for example, polyimide resin. Subsequently, a rubbing process is performed with respect to the alignment film 12 (step S3). Accordingly, the first substrate 10 is formed.

Figure 5B:
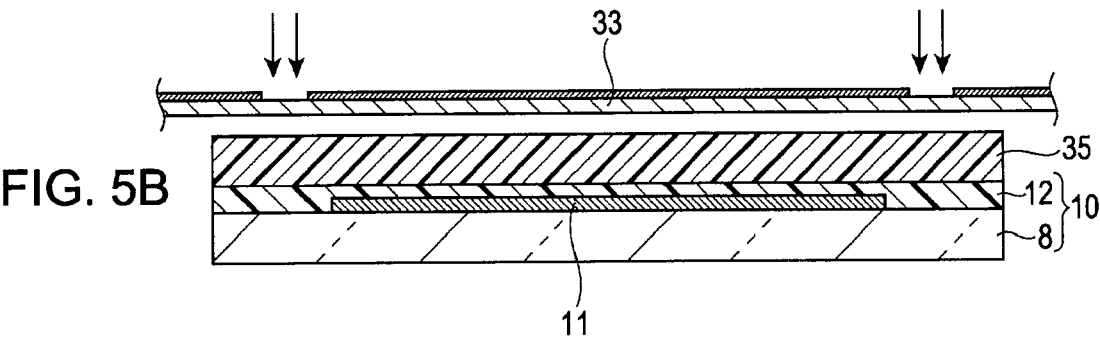

Next, as shown in FIG. 5B, a photosensitive resin film 35 such as photosensitive epoxy resin or the like is applied on the alignment film 12 of the first substrate 10. In addition, the photosensitive resin film 35 is exposed using a photomask 33 having an outer shape of the annular seal guide.

Figure 5C:
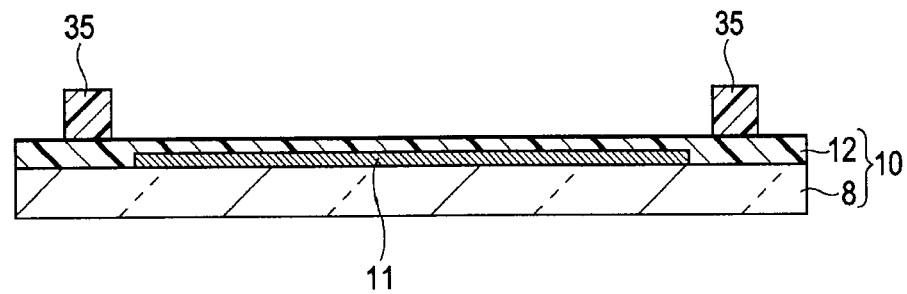

Thereafter, as shown in FIG. 5C, the photosensitive resin film 35 is developed so as to form a structure having the outer shape of the annular seal guide.

Figure 5D:
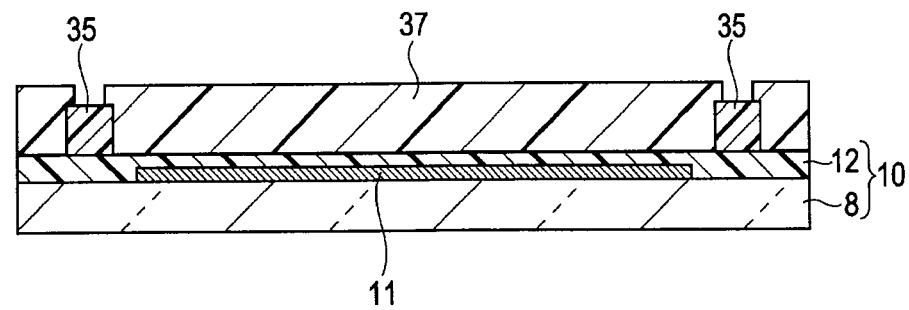

Subsequently, as shown in FIG. 5D, a resist film 37 is applied and is patterned in the shape of the groove portion of the seal guide.

Figure 5E:
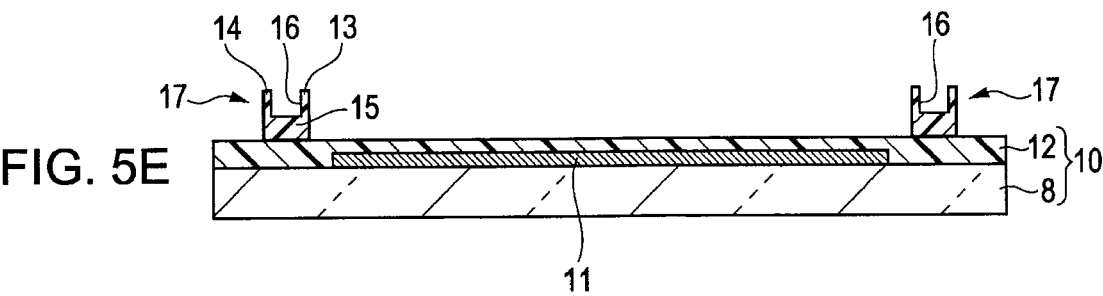

In addition, the photosensitive resin film 35 is half-etched using the resist film 37 as a mask so as to form the groove portion 16, the resist film 37 is removed, and the seal guide 17 shown in FIG. 5E is formed (step S4). In addition, the seal guide 17 may be formed using a multi-level gradation exposure technique. In this case, the seal guide 17 can be collectively formed although the process of forming the groove portion 16 is not provided. In addition, the seal guide 17 may be formed by thermoplastic resin, photosensitive resin or the like using a nano-imprint technique. In addition, the rubbing process may be performed after the seal guide 17 is formed.

Figure 6A:
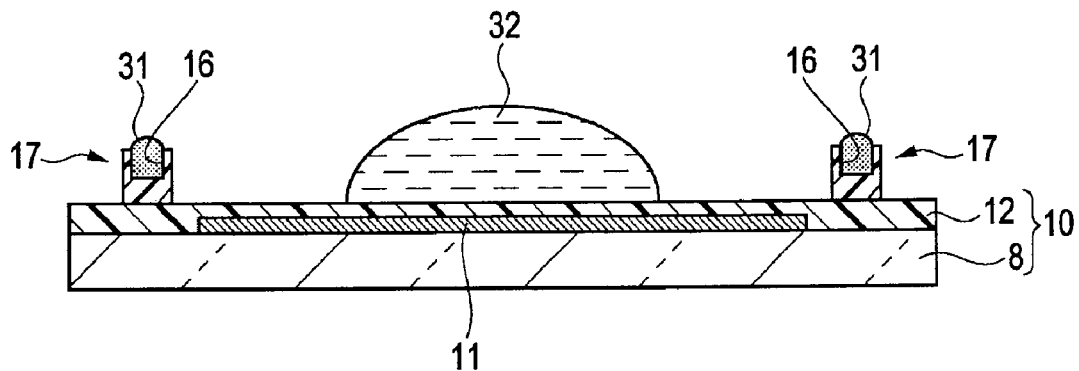
FIG. 6 is an explanation view explaining the method of manufacturing the liquid crystal device according to the first embodiment of the invention.

Next, as shown in FIG. 6A, the seal material 31 formed of ultraviolet curing epoxy resin is applied on the annular groove portion 16 of the seal guide 17 (step S5). The seal material 31 is disposed in the groove 16 using a dispenser with one stroke without disconnection.

In addition, the liquid crystal 32 is dripped in the region surrounded by the inside of the seal guide 17 (step S6). As the method of dripping the liquid crystal 32, a dispenser, an ink jet head or the like may be used. In addition, the liquid crystal 32 may be disposed in the central portion of an application region or may be disposed in a plurality of places over the entire application region.

Although not shown, the second substrate is formed by the same process as the first substrate 10. That is, the rear electrode 21, a wire and so on are formed on the surface of the second base material 9 formed of the light transmission material such as glass, plastic or the like (step S11). The rear electrode 21 and the wire are formed by sputtering a light transmission conductive film such as ITO or the like on one surface of the second base material 9 and etching the light transmission conductive film. Next, the alignment film 22 is formed on the rear electrode 21 (step S12). The alignment film 22 is formed by applying or printing, for example, polyimide resin. Subsequently, a rubbing process is performed with respect to the alignment film 22 (step S13). Accordingly, the second substrate 20 is formed.

Figure 6B:
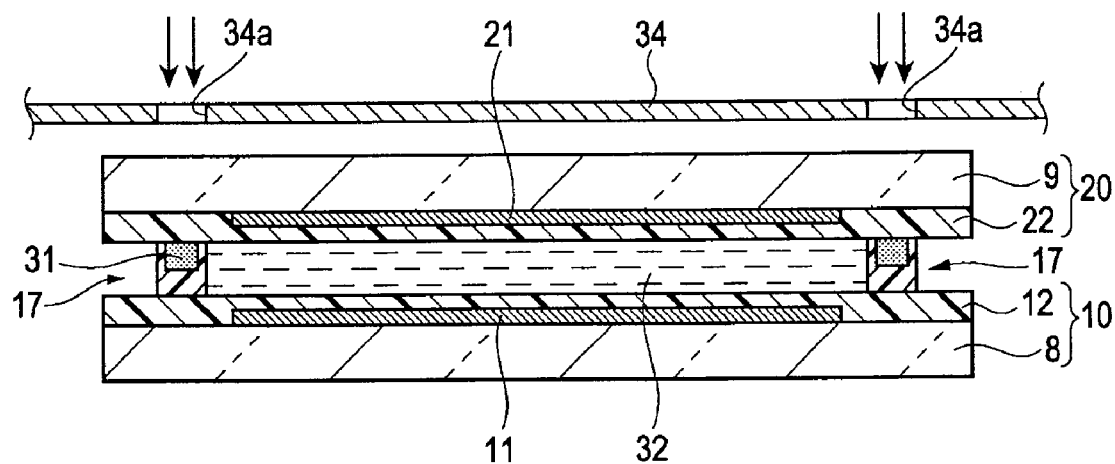

Next, as shown in FIG. 6B, the second substrate 20 is laid on the first substrate 10. A metal mask 34 having an opening 34a formed in a portion in which the seal material 31 is disposed is disposed on the second substrate 20 and ultraviolet rays are irradiated thereon. In addition, the seal material 31 is cured and the first substrate 10 and the second substrate 20 are adhered with the liquid crystal 32 interposed therebetween (step S21). By disposing the metal mask 34 and irradiating the ultraviolet rays, the liquid crystal 32 does not receive the ultraviolet rays and thus the liquid crystal 32 does not deteriorate. In addition, the seal guide 17 may include an absorption agent for absorbing the ultraviolet rays or a coloring pigment. Accordingly, it is possible to prevent the ultraviolet rays from being leaked from the seal guide 17 to the liquid crystal 32.

Figure 6C:
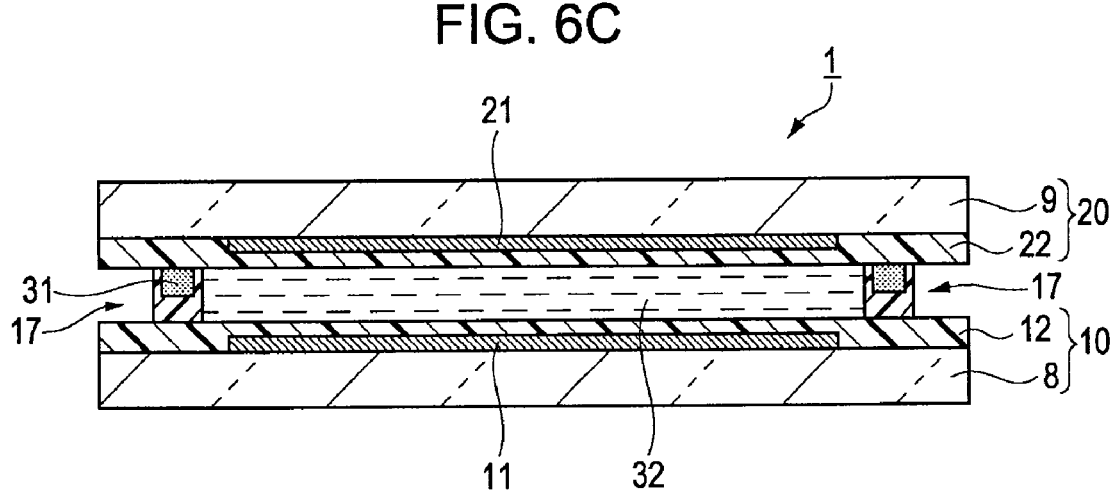

Next, as shown in FIG. 6C, the adhered multiple-production mother substrate is cut so as to be divided into individual liquid crystal devices 1 (step S22).

In addition, after the step S22, cleaning is performed, polarization plates are mounted on the surfaces of the first base material 8 and the second base material 9, and a liquid crystal driving IC is mounted with a flexible printed circuit (FPC) or the like interposed therebetween, thereby configuring the liquid crystal device.

According to the liquid crystal device 1 of the present embodiment, the seal guide 17 formed on the first substrate 10 includes the first partition wall 13, the second partition wall 14, and the connection portion 15, the seal material 31 is disposed in the groove portion 16 defined by the first partition wall 13, the second partition wall 14 and the connection portion 15, and the first substrate 10 and the second substrate 20 are adhered.

Since the connection portion 15 for connecting the first partition wall 13 and the second partition wall 14 is formed, the groove portion 16 in which the seal material 31 is disposed becomes shallow. Accordingly, it is possible to reduce the disposed amount of seal material 31 and to reduce the amount of seal material 31 which overhangs from the first partition wall 13 to the injection side of the liquid crystal 32.

The first partition wall 13 and the second partition wall 14 are reinforced by the connection portion 15 such that the collapse of the first partition wall 13 and the second partition wall 14 due to external force applied when the alignment film rubbing process is performed after the seal guide 17 is formed or when the substrates are adhered is prevented. Accordingly, it is possible to reduce the amount of seal material 31 which overhangs from the first partition wall 13 to the injection side of the liquid crystal 32.

Accordingly, since the amount of seal material 31 which overhangs to the injection side of the liquid crystal 32 is reduced and the elution of resin or additive components contained in the seal material 31 due to the contact with the liquid crystal 32 is remarkably reduced, the deterioration of the display quality of the liquid crystal device 1, such as display unevenness, alignment abnormality or the like, can be prevented. In particular, if the dripping injection method of the liquid crystal 32 is employed, the amount of seal material 31 which overhangs to the injection side of the liquid crystal 32 can be reduced and the contact between the liquid crystal 32 and the uncured seal material 31 can be reduced.

Since the seal material 31 can be disposed in the groove portion 16, the seal material 31 does not flowing out of the groove portion 16, and the seal material 31 formed of photo curing resin, thermosetting resin, or photo-thermosetting resin may be used without depending on the viscosity of the seal material 31. Accordingly, the selection range of the seal material 31 is increased and a seal material suitable for the use may be used.

Although the seal guide 17 is formed on the alignment film 12 in the above embodiment, the seal guide 17 may be formed on the first base material 8.

FIG. 7 is an explanation view showing another arrangement example of the alignment film of the first substrate.

Figure 7A:
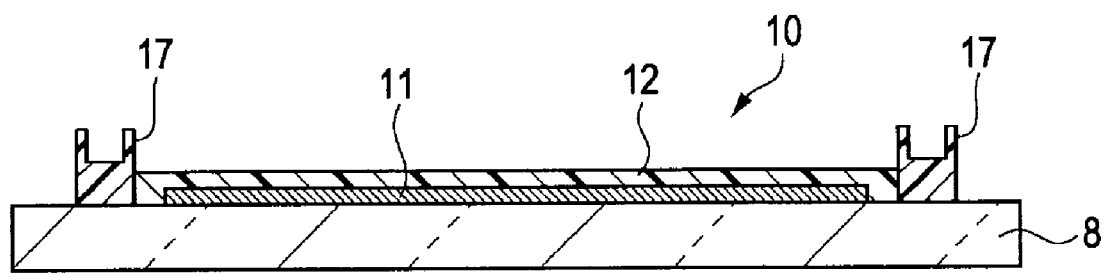
FIG. 7 is an explanation view showing another arrangement example of an alignment film of a first substrate according to the first embodiment of the invention.

As shown in FIG. 7A, the annular seal guide 17 is formed on the first base material 8 using a photolithographic technique, and, thereafter, the alignment film 12 is applied in the region surrounded by the seal guide 17 using a disperser, an ink jet head or the like. By this configuration, the alignment film 12 can be formed only in a necessary region and the height accuracy of the seal guide 17 for defining the cell gap can be secured.

Figure 7B:
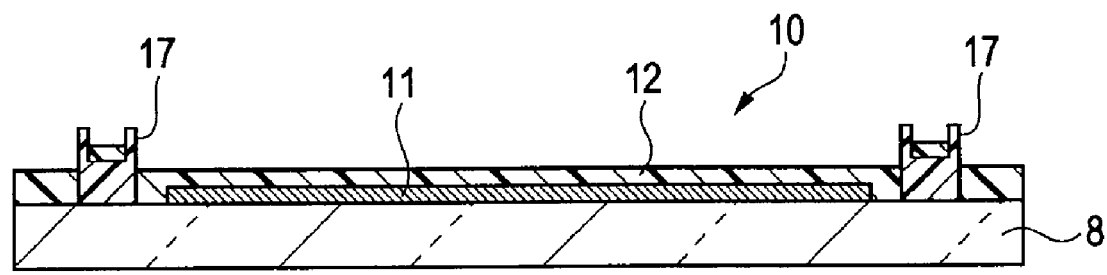

Similarly, as shown in FIG. 7B, the annular seal guide 17 may be formed on the first base material 8 using a photolithographic technique, and, thereafter, the alignment film 12 may be applied using a spin coater, a spray or the like. By this configuration, the height accuracy of the seal guide 17 for defining the cell gap can be secured and thus the alignment film 12 can be easily formed.

Next, other shapes of the groove portion will be described.

FIG. 8 is a schematic cross-sectional view explaining other shapes of the groove portion.

Figure 8A:
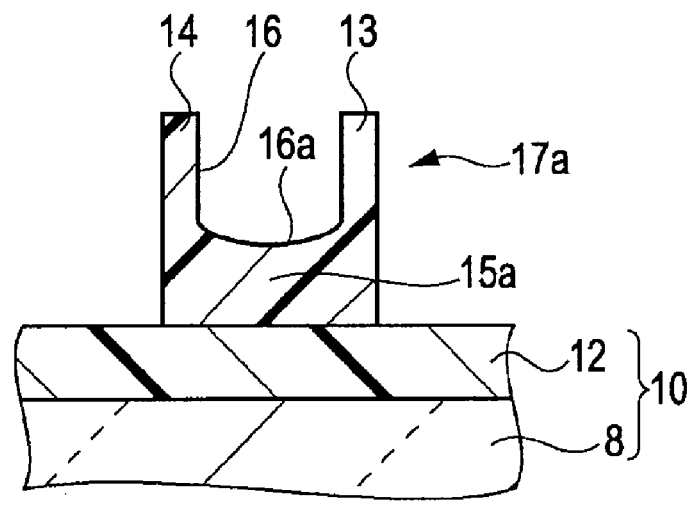
FIG. 8 is a schematic cross-sectional view explaining other shapes of a groove portion of a seal guide according to the first embodiment of the invention.

As shown in FIG. 8A, a seal guide 17a includes the first partition wall 13, the second partition wall 14, and a connection portion 15a for connecting both partition walls, all of which define the groove portion 16. A surface 16a configuring the groove portion 16 of the connection portion 15a is recessed toward the first substrate 10 in an arc shape.

By this configuration, the large surface area of the groove portion 16 can be secured while restricting the amount of seal material disposed in the groove portion 16 and the adhesion strength of the first substrate 10 and the second substrate 20 can be improved.

Figure 8B:
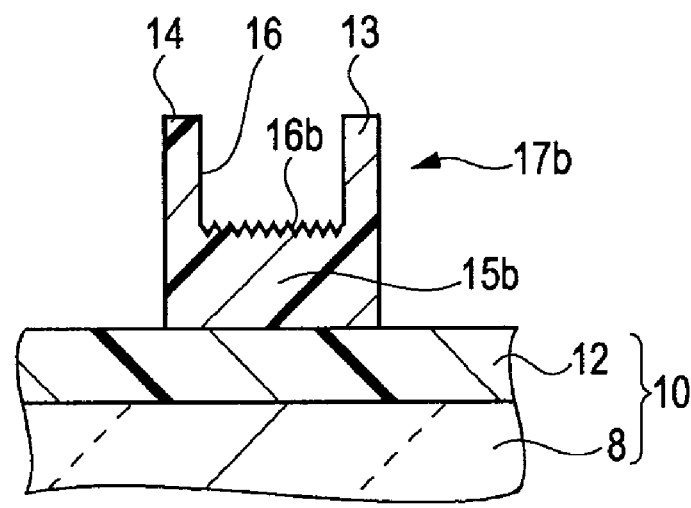

As shown in FIG. 8B, the first partition wall 13, the second partition wall 14, and a connection portion 15b for connecting both partition walls are included, all of which define the groove portion 16. In a surface 16b configuring the groove portion 16 of the connection portion 15b, irregularities are formed. That is, the bottom of the groove portion 16 is subjected to a roughing process.

By forming the irregularities in the surface of the connection portion 15b, the large surface area of the groove portion 16 can be secured and the adhesion strength of the first substrate 10 and the second substrate 20 can be improved.

Second Embodiment

Liquid Crystal Device 2

Next, a liquid crystal device according to a second embodiment will be described. The present embodiment is different from the first embodiment only in the shape of the seal guide, the same components are denoted by the same reference numerals as the first embodiment, and the description thereof will be simplified.

Figure 9A:
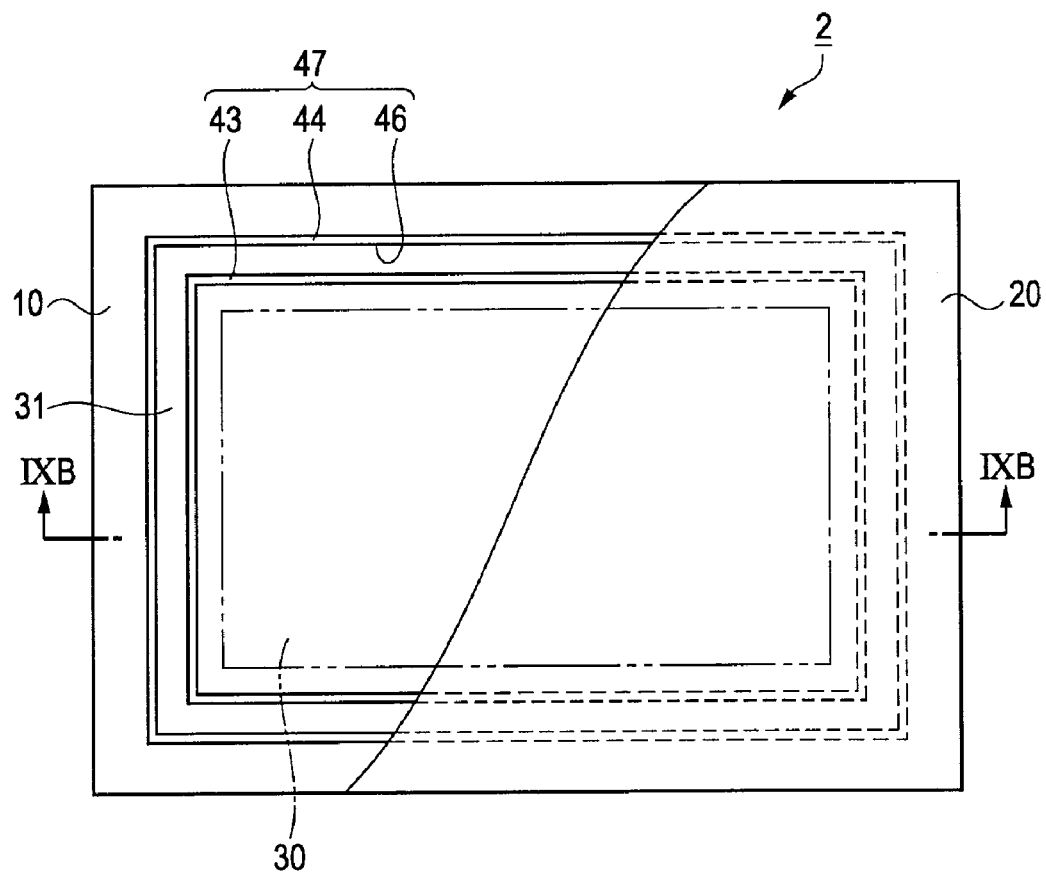
FIG. 9A is a schematic plan view and FIG. 9B is a schematic cross-sectional view taken along line IXB-IXB of FIG. 9A.
Figure 9B:
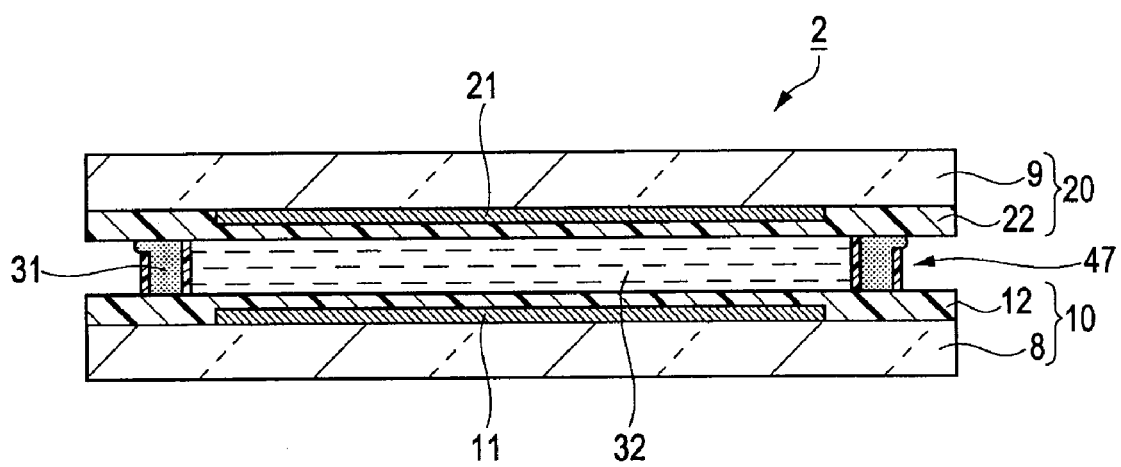
Figure 10A:
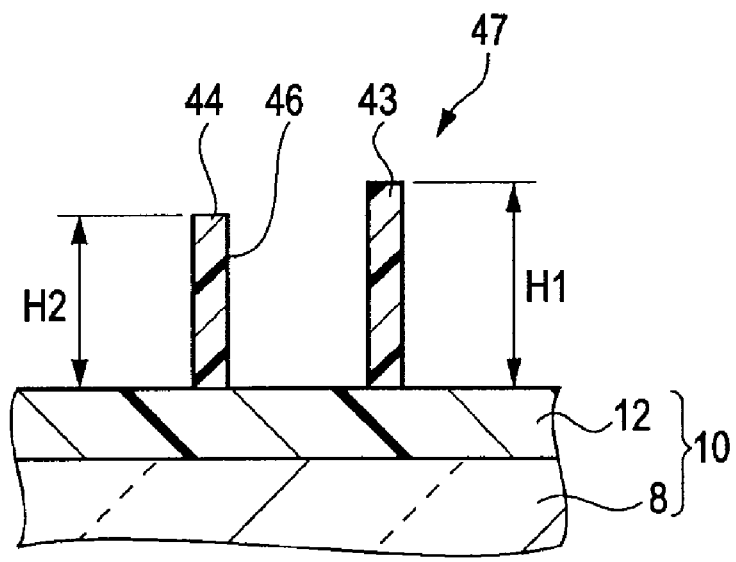
FIG. 10A is a schematic cross-sectional view showing the configuration of the seal guide and FIG. 10B is a schematic cross-sectional view showing a state in which substrates are adhered.
Figure 10B:
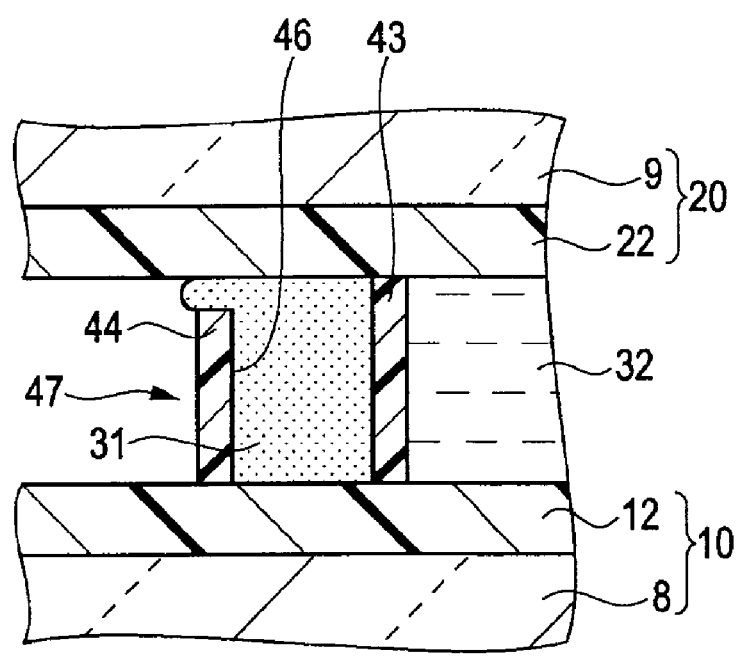

FIG. 9 is a view showing the configuration of the liquid crystal device according to the present embodiment, wherein FIG. 9A is a schematic plan view and FIG. 9B is a schematic cross-sectional view taken along line IXB-IXB of FIG. 9A. FIG. 10 is an explanation view explaining the details of a seal guide, wherein FIG. 10A is a schematic cross-sectional view showing the configuration of the seal guide and FIG. 10B is a schematic cross-sectional view showing a state in which substrates are adhered.

As shown in FIG. 9, the liquid crystal device 2 is integrated by adhering a first substrate 10 and a second substrate 20 by a seal material 31 with liquid crystal 32 interposed therebetween. The seal material 31 is held by a seal guide 47 provided in the edges of the first substrate 10 in an annular shape.

On an alignment film 12 of the first substrate 10, the annular seal guide 47 is extended in a thickness direction of the first substrate 10 and is formed along the outer circumference of a display region 30. As shown in FIGS. 9 and 10, the seal guide 47 includes a first partition wall 43 and a second partition wall 44. The first partition wall 43 extends in the thickness direction of the first substrate 10 so as to surround the outer circumference of the display region 30. In addition, the first partition wall 43 is adjacent to the liquid crystal 32 at one wall surface and is adjacent to the seal material 31 at the other wall surface. The second partition wall 44 extends in the thickness direction of the first substrate 10 so as to surround the outer circumference of the first partition wall 43. In addition, the second partition wall 44 has a wall surface which faces the wall surface of the first partition wall 43 adjacent to the seal material 31.

A relationship between the height H1 of the first partition wall 43 and the height H2 of the second partition wall 44 has a relationship of H1>H2. Accordingly, the cell gap between the first substrate 10 and the second substrate 20 is defined by the height H1 of the first partition wall 43. In such a configuration, a groove portion 46 using the first partition wall 43 and the second partition wall 44 as sidewalls and using the alignment film 12 as a bottom is defined in the seal guide 47.

In addition, a minimum dimension of the dimension (seal line width) of the outer sidewall of the first partition wall 43 and the outer sidewall of the second partition wall 44 of the seal guide 47 is set to 100 μm order (200 to 300 μm). In addition, the dimension of the inner sidewall of the first partition wall 43 and the inner sidewall of the second partition wall 44 is properly set to 50 μm to 2000 μm.

The seal material 31 is arranged in the groove portion 46 in the annular shape without disconnection, and the seal material 31 is cured such that the first substrate 10 and the second substrate 20 are adhered with the liquid crystal 32 interposed therebetween.

At this time, as shown in FIG. 10B, a redundant seal material 31 overhangs to the second partition wall 44 having a height lower than that of the first partition wall 43 so as to be cured.

A difference between the heights of the first partition wall 43 and the second partition wall 44 is formed as a difference of a degree that the seal material 31 does not flow from the second partition wall 44 when the seal material 31 is arranged in the groove portion 46. Accordingly, the difference between the heights of the first partition wall 43 and the second partition wall 44 is properly set by the viscosity of the seal material 31.

The method of manufacturing the liquid crystal device according to the present embodiment is substantially equal to that of the first embodiment and the description will be omitted.

As described above, in the liquid crystal device 2 of the present embodiment, since the height of the second partition wall 44 is lower than that of the first partition wall 43, the redundant seal material 31 overhangs the second partition wall 44 when the first substrate 10 and the second substrate 20 are adhered. That is, the amount of seal material 31 which overhangs from the first partition wall 43 to the injection side of the liquid crystal 32 can be reduced.

Accordingly, since the amount of seal material 31 which overhangs to the injection side of the liquid crystal 32 is reduced and the elution of the resin or additive components contained in the seal material 31 due to the contact with the liquid crystal 32 can be remarkably reduced, the deterioration of the display quality of the liquid crystal device 2, such as display unevenness, alignment abnormality or the like, can be prevented.

Next, other shapes of the seal guide will be described.

Figure 11A:
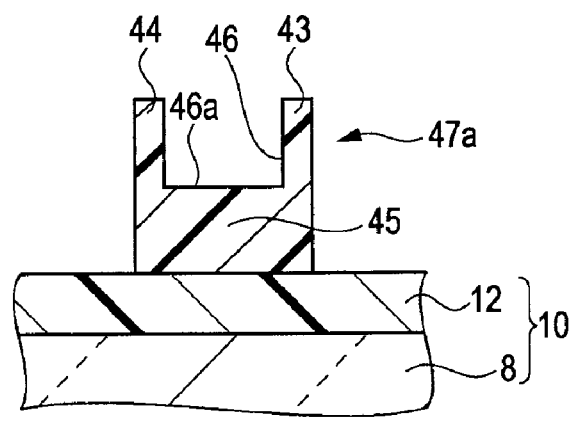
FIG. 11 is a schematic cross-sectional view explaining other shapes of a groove portion of a seal guide according to the second embodiment of the invention.
Figure 11B:
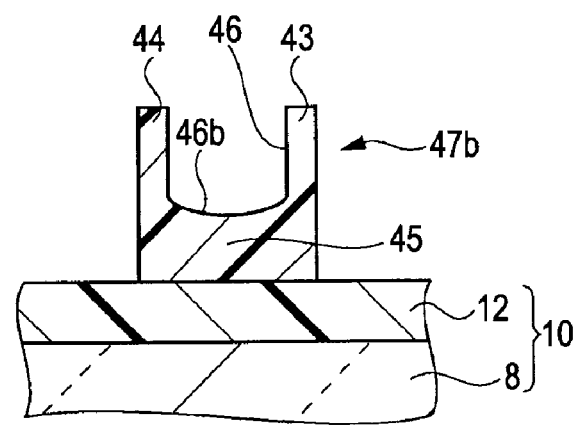
Figure 11C:
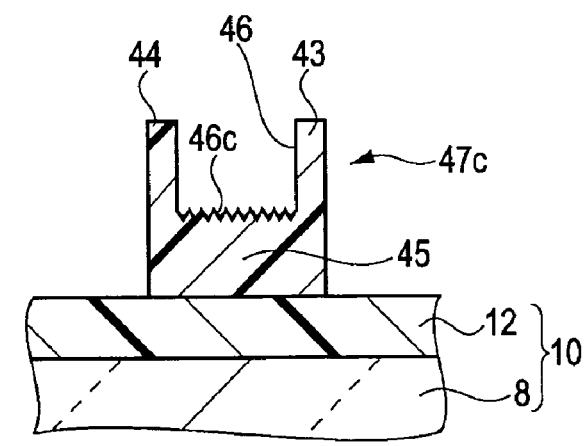
Figure 12A:
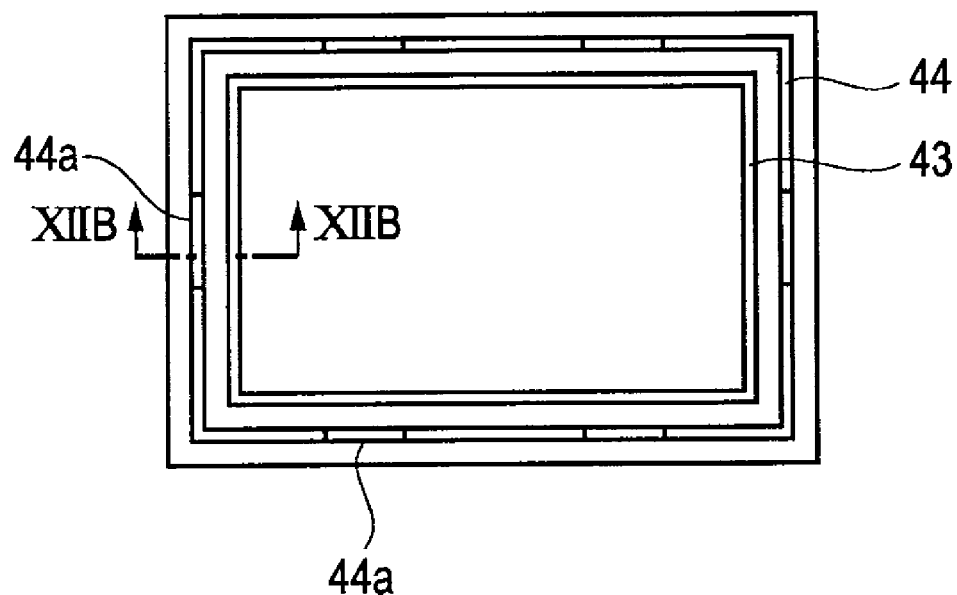
FIG. 12A is a plan view showing the whole shape of the seal guide and FIG. 12B is a cross-sectional view taken along line XIIB-XIIB of FIG. 12A.
Figure 12B:
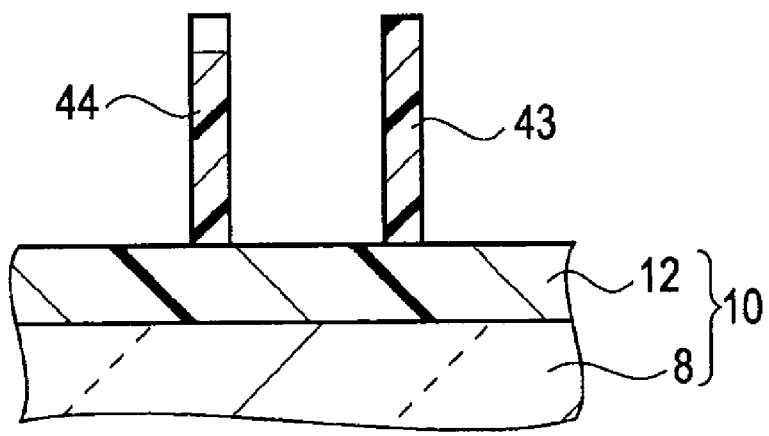

FIG. 11 is a schematic cross-sectional view explaining other shapes of the groove portion of the seal guide according to the second embodiment. FIG. 12 is a view showing the configuration of another seal guide, wherein FIG. 12A is a plan view showing the whole shape of the seal guide and FIG. 12B is a cross-sectional view taken along line XIIB-XIIB of FIG. 12A.

As shown in FIG. 11A, a seal guide 47a includes a connection portion 45 between a first partition wall 43 and a second partition wall 44, all of which define a groove portion 46. A surface 46a of the connection portion 45 configuring this groove portion 46 is flatly formed.

By this configuration, the first partition wall 43 and the second partition wall 44 are reinforced by the connection portion 45 such that the elapse and the peeling of the first partition wall 43 and the second partition wall 44 can be prevented. In addition, since the depth of the groove portion 46 formed between the first partition wall 43 and the second partition wall 44 can be reduced, it is possible to reduce the disposed amount of seal material 31, and to reduce the amount of seal material 31 which overhangs from the first partition wall 43 to the injection side of the liquid crystal and the amount of seal material 31 which overhangs from the second partition wall 44.

As shown in FIG. 11B, a surface 46b of the connection portion 45 configuring this groove portion 46 may be recessed toward the first substrate 10 in an arc shape.

By this configuration, the large surface area of the groove portion 46 can be secured while restricting the amount of seal material 31 disposed in the groove portion 46 and the adhesion strength of the first substrate 10 and the second substrate 20 can be improved.

In addition, as shown in FIG. 1C, irregularities may be formed in a surface 46c of the connection portion 45 configuring this groove portion 46.

By forming the irregularities in the surface of the connection portion 45, the large surface area of the groove portion 46 can be secured and the adhesion strength of the first substrate 10 and the second substrate 20 can be improved.

In addition, as shown in FIG. 12, the first partition wall 43 and the second partition wall 44 are formed with the same height, and a cutout portion 44a is provided in a portion of the second partition wall 44. The second partition wall 44 in which this cutout portion 44a is formed has a height lower than that of the first partition wall 43. A portion having a low height may be formed in the portion of the second partition wall 44.

Third Embodiment

Liquid Crystal Device 3

Next, a liquid crystal device according to a third embodiment will be described. The present embodiment is different from the first and second embodiments only in that seal guides are provided in both a first substrate and a second substrate, the same components are denoted by the same reference numerals as the first embodiment, and the description thereof will be simplified.

Figure 13A:
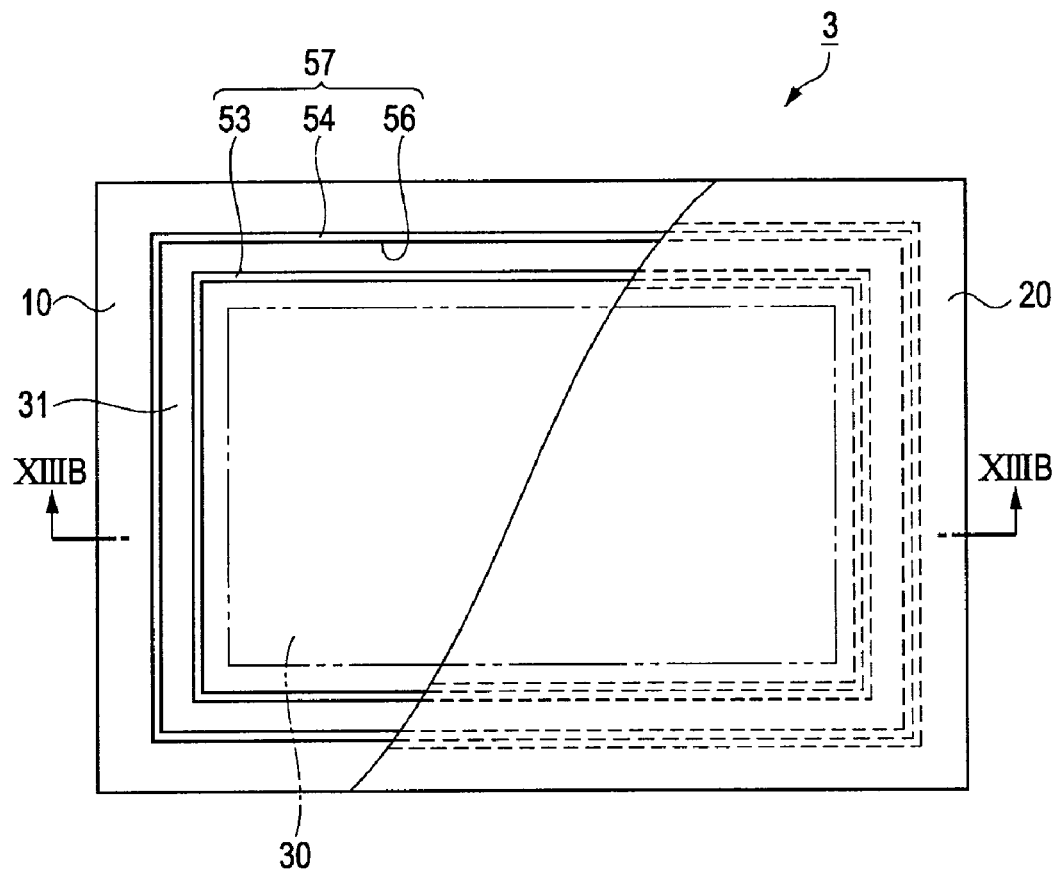
FIG. 13A is a schematic plan view and FIG. 13B is a schematic cross-sectional view taken along line XIIIB-XIIIB of FIG. 13A.
Figure 13B:
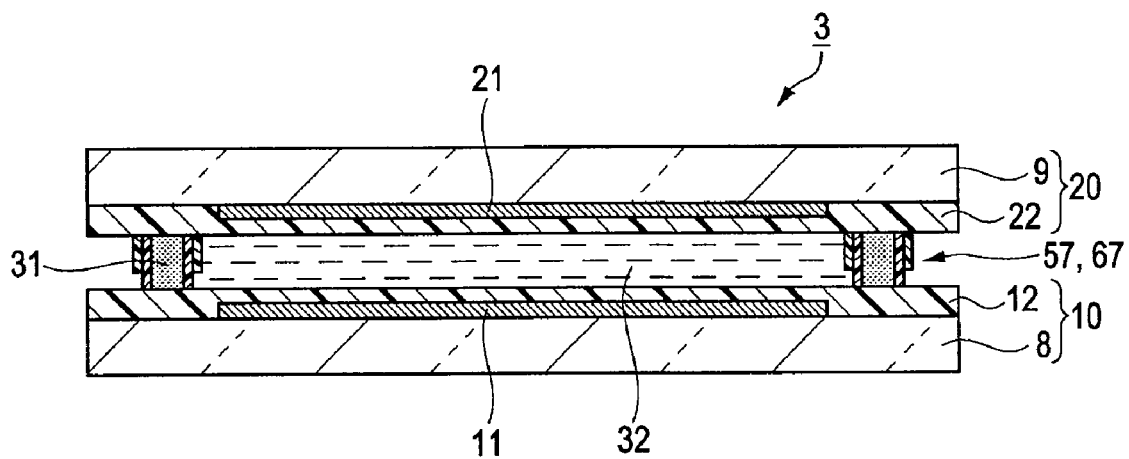
Figure 14A:
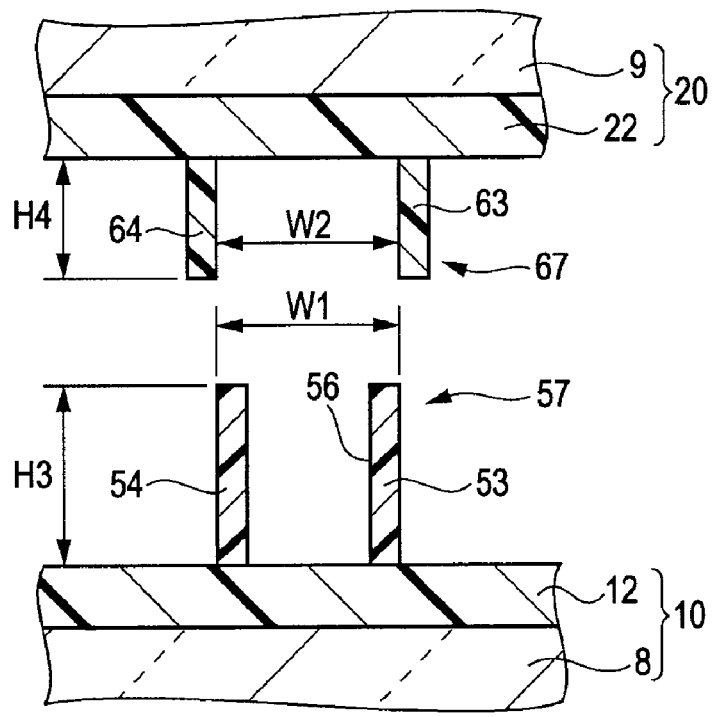
FIG. 14A is a schematic cross-sectional view showing the configuration of the seal guide and FIG. 14B is a schematic cross-sectional view showing a state in which substrates are adhered.
Figure 14B:
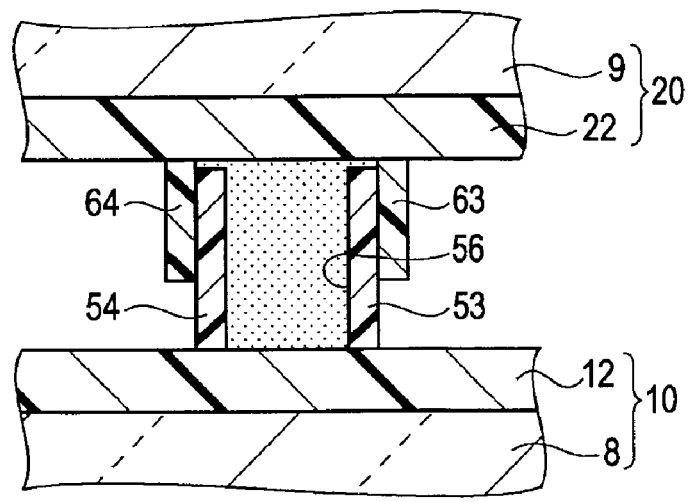

FIG. 13 is a view showing the configuration of the liquid crystal device according to the present embodiment, wherein FIG. 13A is a schematic plan view and FIG. 13B is a schematic cross-sectional view taken along line XIIIB-XIIIB of FIG. 13A. FIG. 14 is an explanation view explaining the details of a seal guide, wherein FIG. 14A is a schematic cross-sectional view showing the configuration of the seal guide and FIG. 14B is a schematic cross-sectional view showing a state in which substrates are adhered.

As shown in FIG. 13, the liquid crystal device 3 is integrated by adhering a first substrate 10 and a second substrate 20 by a seal material 31 with liquid crystal 32 interposed therebetween. When the substrates are adhered, seal guides 57 and 67 are formed on both substrates, a seal material 31 is disposed in the seal guides 57 and 67, and the seal material 31 is cured such that the first substrate 10 and the second substrate 20 are adhered.

The first substrate 10 includes a first base material 8, a front electrode 11, an alignment film 12, and so on. The light transmission front electrode 11 is formed on one surface of the first base material 8 formed of a light transmission material such as glass, plastic or the like, and the alignment film 12 for controlling the alignment of the liquid crystal is formed thereon.

Similarly, the second substrate 20 includes a second base material 9, a rear electrode 21, an alignment film 22, and so on. The light transmission rear electrode 21 is formed on one surface of the second base material 9 formed of a light transmission material such as glass, plastic or the like, and the alignment film 22 for controlling the alignment of the liquid crystal is formed thereon.

On the alignment film 12 of the first substrate 10, the annular seal guide 57 is extended in a thickness direction of the first substrate 10 and is formed along the outer circumference of a display region 30.

As shown in FIGS. 13 and 14, the seal guide 57 includes a first partition wall 53 and a second partition wall 54. The first partition wall 53 extends in the thickness direction of the first substrate 10 so as to surround the outer circumference of the display region 30. The second partition wall 54 extends in the thickness direction of the first substrate 10 so as to surround the outer circumference of the first partition wall 53. The first partition wall 53 and the second partition wall 54 are formed with the same height so as to define a cell gap between both substrates. In such a configuration, a groove portion 56 which uses the first partition wall 53 and the second partition wall 54 as sidewalls and uses the surface of the alignment film 12 as a bottom is defined in the seal guide 57.

In addition, a minimum dimension of the dimension (seal line width) of the outer sidewall of the first partition wall 53 and the outer sidewall of the second partition wall 54 of the seal guide 57 is set to 100 μm order (200 to 300 μm). In addition, the dimension of the inner sidewall of the first partition wall 53 and the inner sidewall of the second partition wall 54 is properly set to 50 μm to 2000 μm.

Similarly, on then alignment film 22 of the second substrate 20, an annular seal guide 67 is extended in a thickness direction of the second substrate 20 and is formed along the outer circumference of the display region 30.

As shown in FIG. 14, the seal guide 67 includes a third partition wall 63 and a fourth partition wall 64. The third partition wall 63 extends in the thickness direction of the second substrate 20 so as to surround the outer circumference of the display region 30. The fourth partition wall 64 extends in the thickness direction of the second substrate 20 so as to surround the outer circumference of the third partition wall 63. The third partition wall 63 and the fourth partition wall 64 are formed with the same height.

In addition, when the width of the outside of the seal guide 57 is W1 and the width of the inside of the seal guide 67 is W2, a relationship of W1<W2 is satisfied. In addition, when the height of the first partition wall 53 and the second partition wall 54 is H3 and the height of the third partition wall 63 and the fourth partition wall 64 is H4, a relationship of H3>H4 is satisfied. In a state in which the first substrate 10 and the second substrate 20 are adhered, the outside of the first partition wall 53 and the inside of the third partition wall 63, and the outside of the second partition wall 54 and the inside of the fourth partition wall 64 are formed at positions where the partition walls are in contact with each other.

The positions where the partition walls are in contact with each other include a position having a minute gap between the partition walls. When the first substrate 10 and the second substrate 20 are adhered, a state in which the seal material 31 is infiltrated into this gap is preferable.

The seal guides 57 and 67 are provided in both the first substrate 10 and the second substrate 20, the seal material 31 which overhangs from the first partition wall 53 to the liquid crystal injection side is held between the first partition wall 53 and the third partition wall 63, and the amount of seal material 31 which can be brought into contact with the liquid crystal 32 can be reduced.

In addition, since the overhung seal material 31 is held between the first partition wall 53 and the third partition wall 63 and between the second partition wall 54 and the fourth partition wall 64, an adhesion area is increased and thus the adhesion strength between the first substrate 10 and the second substrate 20 can be improved. In addition, the seal guide 67 functions as the guide in the adhesion of the substrates and thus the adhesion precision of the substrates can be improved.

Method of Manufacturing Liquid Crystal Device 3

Next, an example of a method of manufacturing the liquid crystal device 3 according to the present embodiment will be described.

Figure 15:
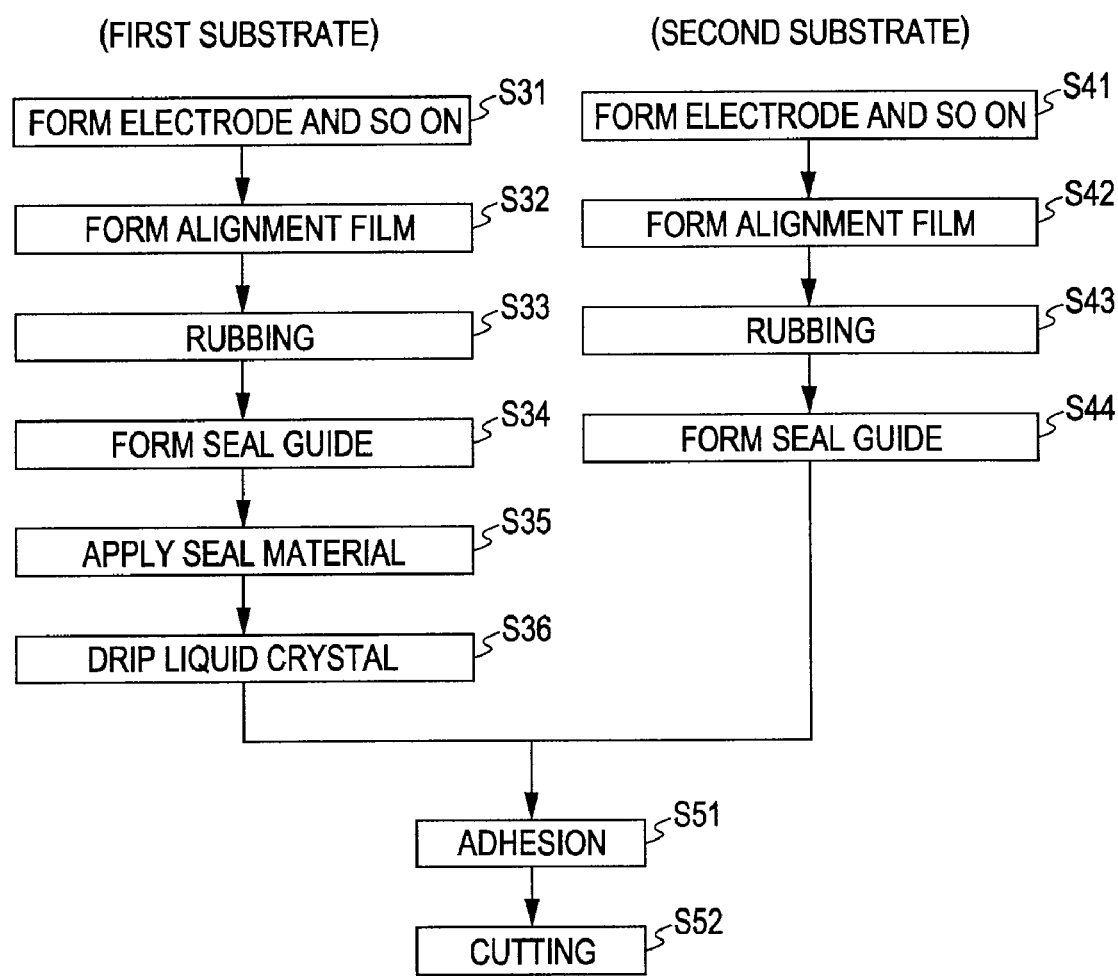
FIG. 15 is a flowchart explaining a method of manufacturing the liquid crystal device according to the third embodiment of the invention.

FIG. 15 is a flowchart explaining the method of manufacturing the liquid crystal device. FIGS. 16, 17 and 18 are explanation views explaining the method of manufacturing the liquid crystal device.

Even in the manufacture of the liquid crystal device 3, the manufacture is performed by the multiple production, and a first mother substrate and a second mother substrate are adhered with liquid crystal interposed therebetween and are cut and divided into liquid crystal devices 3.

Hereinafter, the manufacturing method using FIGS. 16, 17 and 18 according to the flowchart of FIG. 15 will be described. In addition, one of the liquid crystal devices obtained by the multiple production will be shown and described.

Figure 16A:
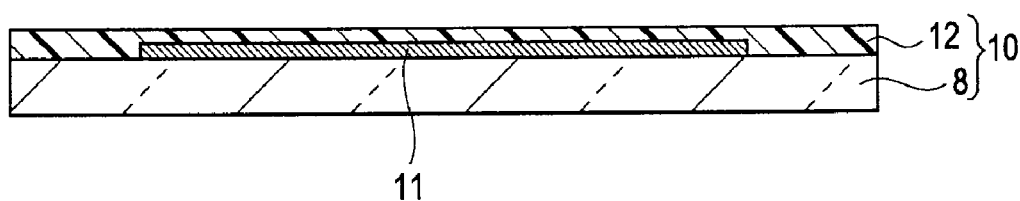
FIG. 16 is an explanation view explaining the method of manufacturing the liquid crystal device according to the third embodiment of the invention.

As shown in FIG. 16A, the front electrode 11, a wire and so on are formed on the surface of the first base material 8 (step S31). Next, the alignment film 12 is formed on the front electrode 11 (step S32). Subsequently, a rubbing process is performed with respect to the alignment film 12 (step S33). Thus, the first substrate 10 is formed.

Figure 16B:
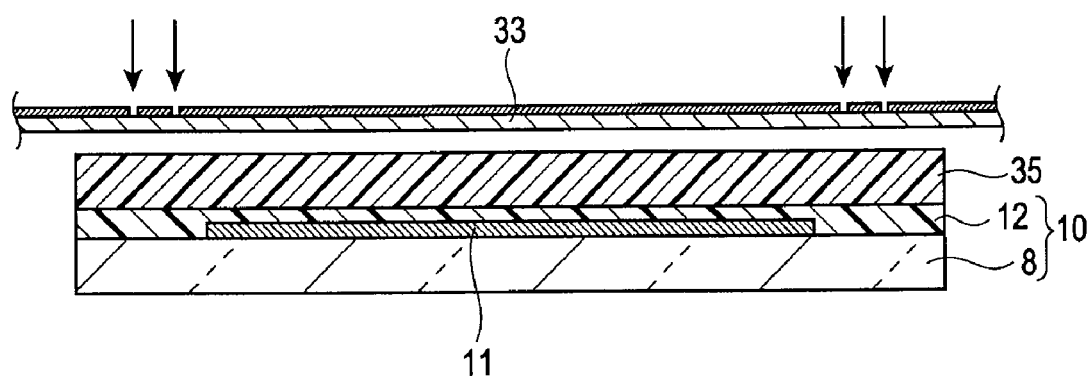

As shown in FIG. 16B, a photosensitive resin film 35 is applied on the alignment film 12 of the first substrate 10. The photosensitive resin film 35 is exposed using a photomask 33 having an outer shape of the annular seal guide.

Figure 16C:
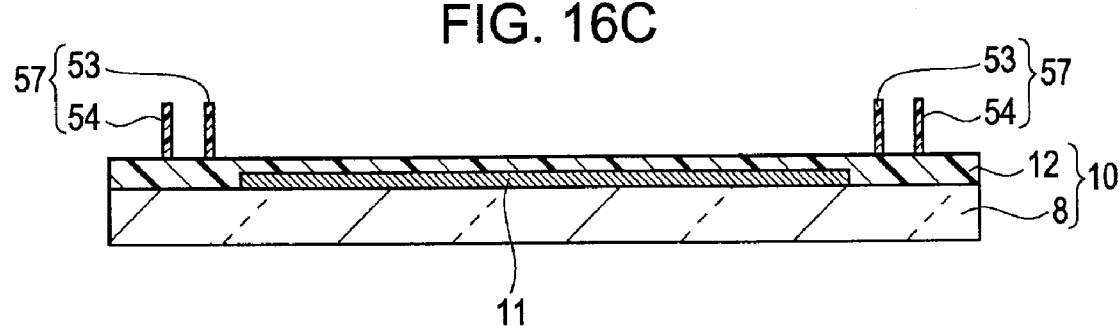

Thereafter, as shown in FIG. 16C, the photosensitive resin film 35 is developed so as to form the seal guide 57 having the first partition wall 53 and the second partition wall 54 (step S34).

Figure 17A:
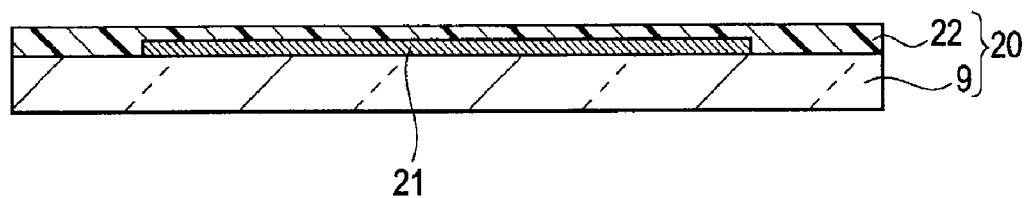
FIG. 17 is an explanation view explaining the method of manufacturing the liquid crystal device according to the third embodiment of the invention.

Meanwhile, the second substrate 20 is formed by the same manufacturing method. As shown in FIG. 17A, the rear electrode 21, a wire and so on are formed on the surface of the second base material 9 (step S41). Next, the alignment film 22 is formed on the rear electrode 21 (step S42). Subsequently, a rubbing process is performed with respect to the alignment film 22 (step S43). Thus, the second substrate 20 is formed.

Figure 17B:
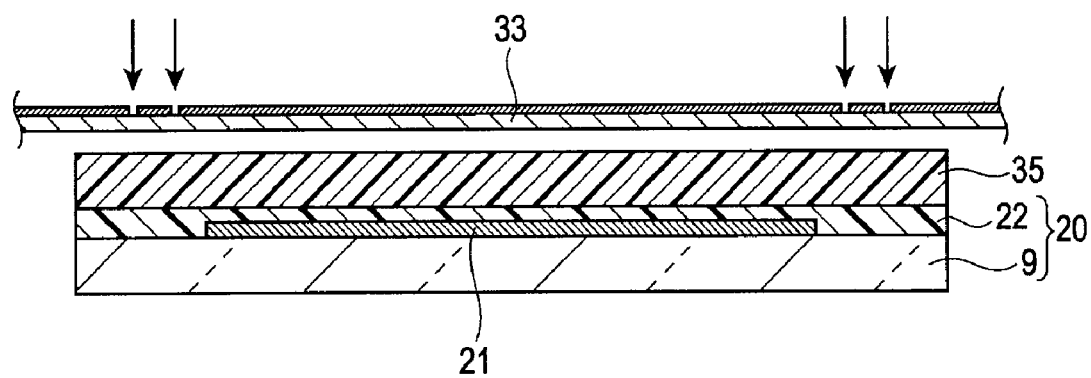

Next, as shown in FIG. 17B, a photosensitive resin film 35 is applied on the alignment film 22 of the second substrate 20. The photosensitive resin film 35 is exposed using a photomask 33 having an outer shape of the annular seal guide.

Figure 17C:
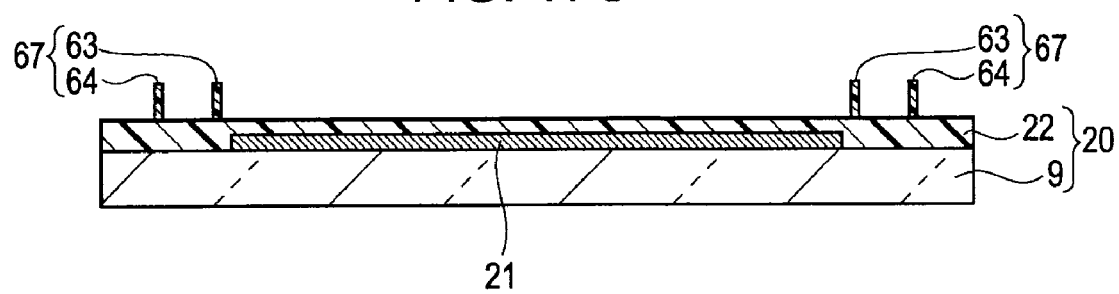

Thereafter, as shown in FIG. 17C, the photosensitive resin film 35 is developed so as to form the seal guide 67 having the third partition wall 63 and the fourth partition wall 64 (step S44).

In addition, the seal guides 57 and 67 may be formed by thermoplastic resin, photosensitive resin or the like using a nano-imprint technique. In addition, the rubbing process may be performed after the seal guides 57 and 67 are formed.

Figure 18A:
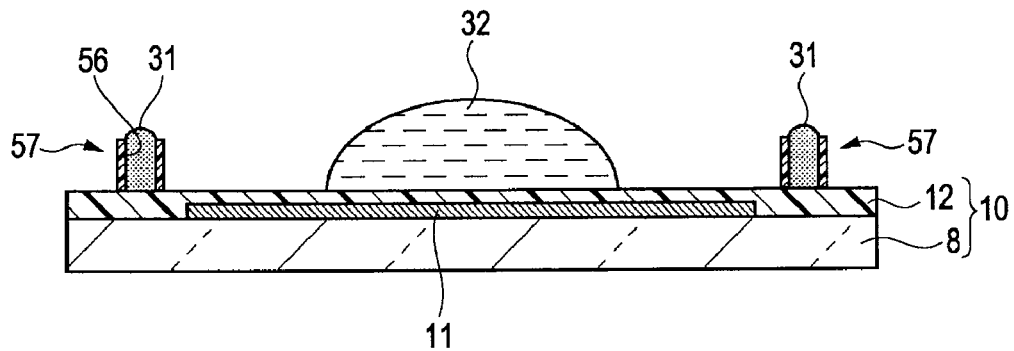
FIG. 18 is an explanation view explaining the method of manufacturing the liquid crystal device according to the third embodiment of the invention.

Subsequently, as shown in FIG. 18A, the seal material 31 formed of ultraviolet curing epoxy resin is applied on the annular groove portion 56 of the seal guide 57 (step S35). The seal material 31 is disposed in the groove portion 56 using a dispenser with one stroke without disconnection.

In addition, the liquid crystal 32 is dripped in the region surrounded by the inside of the seal guide 57 (step S36). As the method of dripping the liquid crystal 32, a dispenser, an ink jet head or the like may be used. In addition, the liquid crystal 32 may be disposed in the central portion of an application region or may be disposed in a plurality of places over the entire application region.

Figure 18B:
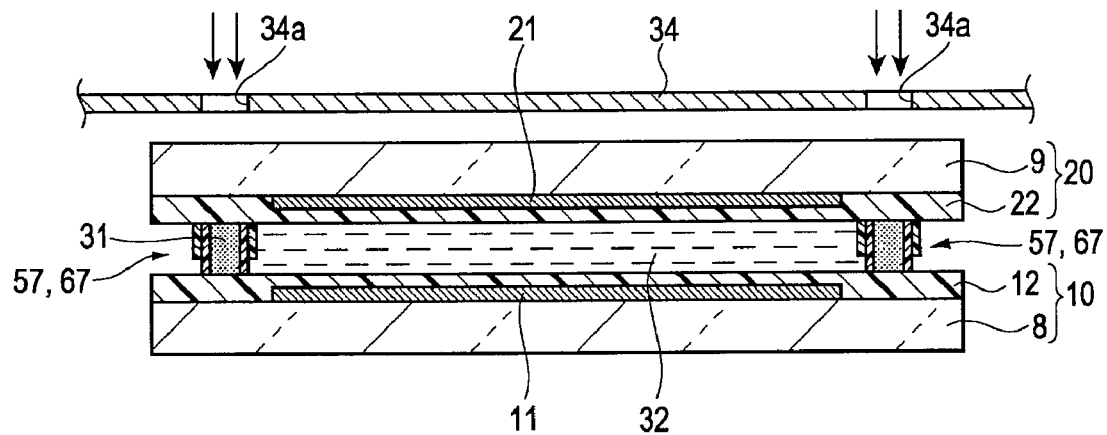

Next, as shown in FIG. 18B, the second substrate 20 is laid on the first substrate 10. A metal mask 34 having an opening 34a formed in a portion in which the seal material 31 is disposed is disposed on the second substrate 20 and ultraviolet rays are irradiated thereon. In addition, the seal material 31 is cured and the first substrate 10 and the second substrate 20 are adhered with the liquid crystal 32 interposed therebetween (step S51). By disposing the metal mask 34 and irradiating the ultraviolet rays, the liquid crystal 32 does not receive the ultraviolet rays and thus the liquid crystal 32 does not deteriorate. In addition, the seal guides 57 and 67 may include an absorption agent for absorbing the ultraviolet rays or a coloring pigment. Accordingly, it is possible to prevent the ultraviolet rays from being leaked from the seal guides 57 and 67 to the liquid crystal 32.

Figure 18C:
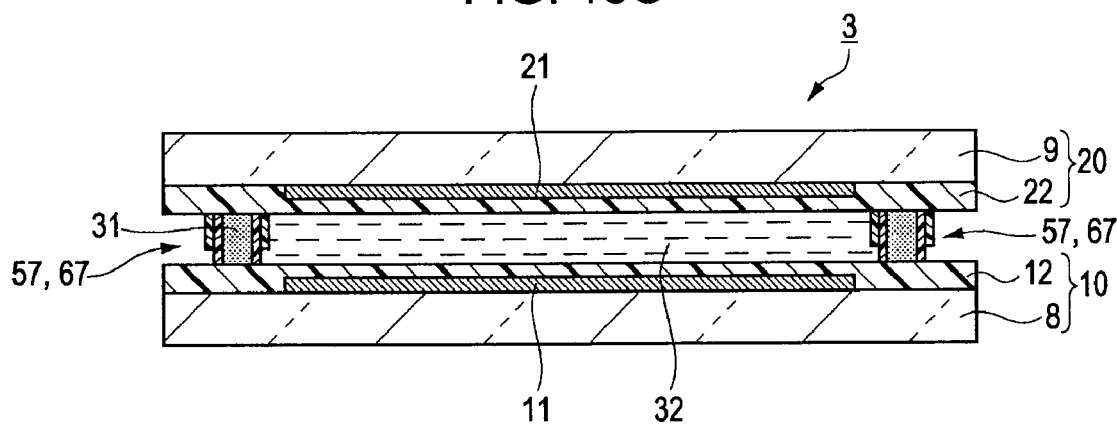

Next, as shown in FIG. 18C, the adhered multiple-production mother substrate is cut so as to be divided into individual liquid crystal devices 3 (step S52).

In addition, after the step S52, cleaning is performed, polarization plates are mounted on the surfaces of the first base material 8 and the second base material 9, and a liquid crystal driving IC is mounted with a FPC or the like interposed therebetween, thereby configuring the liquid crystal device.

According to the liquid crystal device 3 of the present embodiment, the first partition wall 53 and the second partition wall 54 at the outside thereof are formed on the first substrate 10, and the third partition wall 63 and the fourth partition wall 64 are formed on the second substrate 20. At the adhesion position of the first substrate 10 and the second substrate 20, the third partition wall 63 is provided at a position which is in contact with the first partition wall 53, the seal material 31 is disposed in the groove portion 56, and the first substrate 10 and the second substrate 20 are adhered.

The seal material 31 which overhangs from the first partition wall 53 to the liquid injection side is held between the first partition wall 53 and the third partition wall 63, and the amount of seal material 31 which is capable of being in contact with the liquid crystal 32 can be reduced.

Accordingly, since the amount of seal material 31 which is capable of being in contact with the liquid crystal 32 is reduced and the elution of resin or additive components contained in the seal material 31 due to the contact with the liquid crystal 32 is remarkably reduced, the deterioration of the display quality of the liquid crystal device 3, such as display unevenness, alignment abnormality or the like, can be prevented.

Next, other shapes and combinations of the seal guides formed on the first substrate and the second substrate will be described.

Figure 19A:
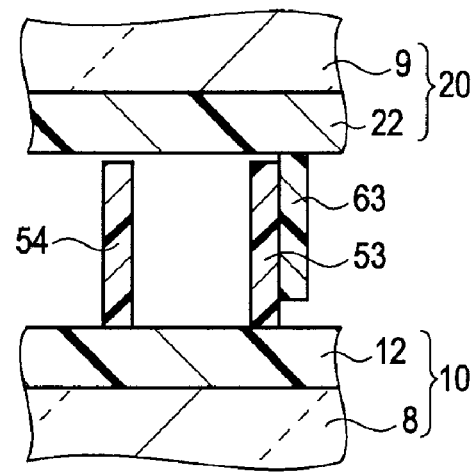
FIG. 19 is a schematic cross-sectional view showing other shapes and combinations of seal guides according to the third embodiment of the invention.
Figure 19B:
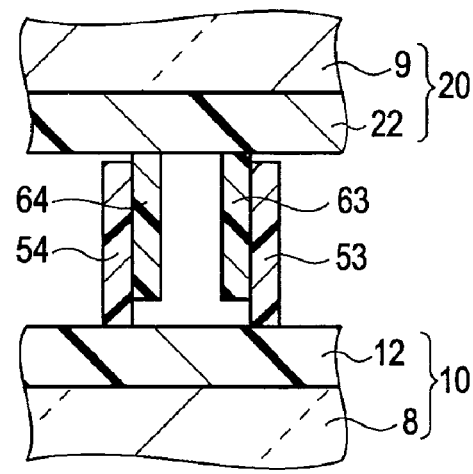
Figure 19C:
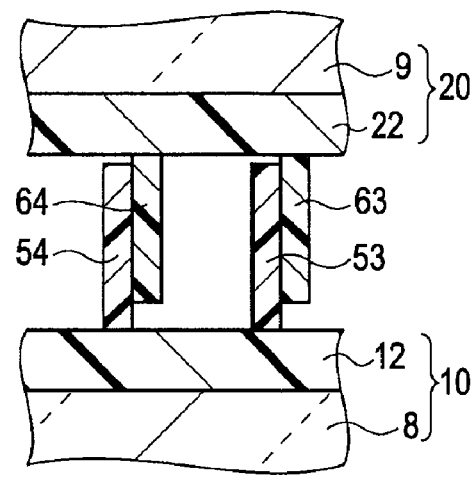

FIGS. 19, 20 and 21 are schematic cross-sectional views showing other shapes and combinations of the seal guides. In FIGS. 19A to 19C, the configuration of the first partition wall 53 and the second partition wall 54 formed on the first substrate 10 is similar to that of the third embodiment and the configuration of the partition walls formed on the second substrate 20 is different from that of the third embodiment.

In FIG. 19A, a third partition wall 63 which is in contact with the outside of the first partition wall 53 is formed on the second substrate 20.

In FIG. 19B, a third partition wall 63 and a fourth partition wall 64 which are respectively in contact with the insides of the first partition wall 53 and the second partition wall 54 are formed on the second substrate 20.

In FIG. 19C, a third partition wall 63 which is in contact with the outside of the first partition wall 53 and a fourth partition wall 64 which is in contact with the inside of the second partition wall 54 are formed on the second substrate 20.

By such a configuration, since the first partition wall 53 and the third partition wall 63 are in contact with each other, the seal material is held between the first partition wall 53 and the third partition wall 63, and the amount of seal material which can be brought into contact with the liquid crystal 32 can be reduced.

Figure 20A:
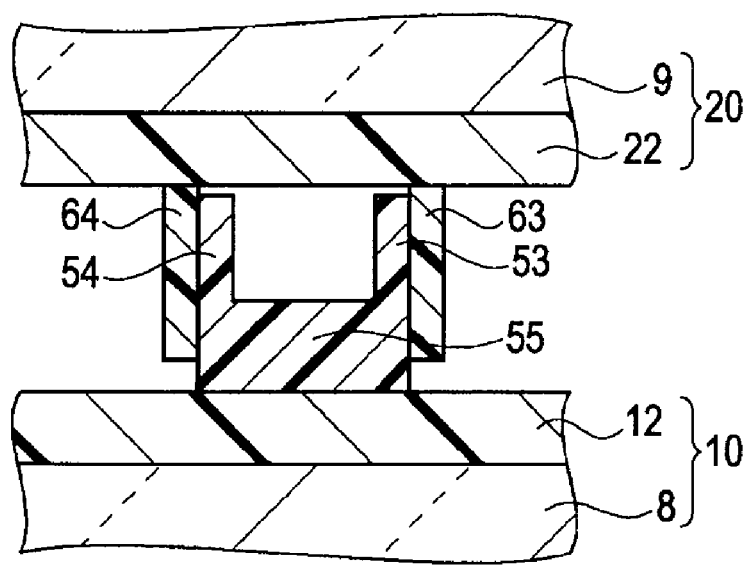
FIG. 20 is a schematic cross-sectional view showing other shapes and combinations of seal guides according to the third embodiment of the invention.
Figure 20B:
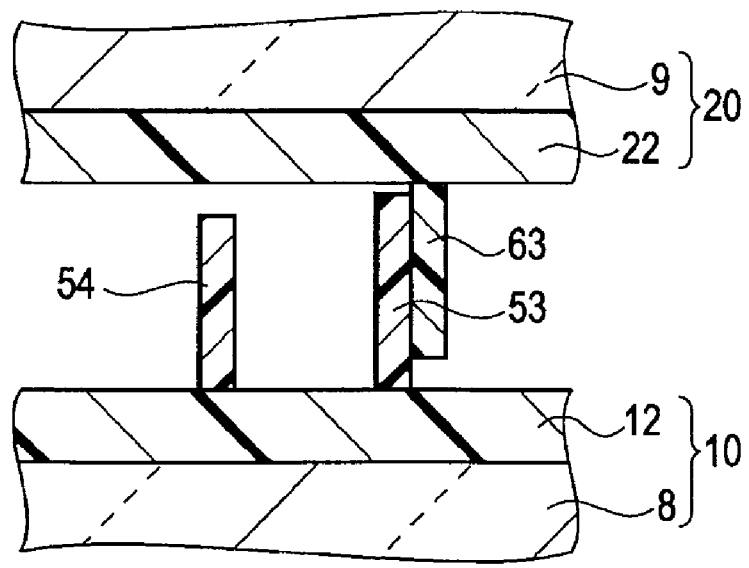

FIGS. 20A and 20B show the cases where a partition wall is formed on the second substrate in addition to the seal guide described in the first and second embodiments.

In FIG. 20A, the first substrate 10 includes the first partition wall 53, the second partition wall 54, and the connection portion 55 for connecting the partition walls, and the second substrate 20 includes a third partition wall 63 and a fourth partition wall 64, which are respectively in contact with the first partition wall 53 and the second partition wall 54 at the outsides thereof.

In FIG. 20B, the first substrate 10 includes the first partition wall 53 and the second partition wall 54 having a height lower than that of the first partition wall, and the second substrate 20 includes a third partition wall 63 which is in contact with the outside of the first partition wall 53.

By such a configuration, since the first partition wall 53 and the third partition wall 63 are disposed so as to be in contact with each other, the seal material is held between the first partition wall 53 and the third partition wall 63, and the amount of seal material which can be brought into contact with the liquid crystal 32 can be reduced.

In addition, the embodiments shown in FIG. 21 are possible.

Figure 21A:
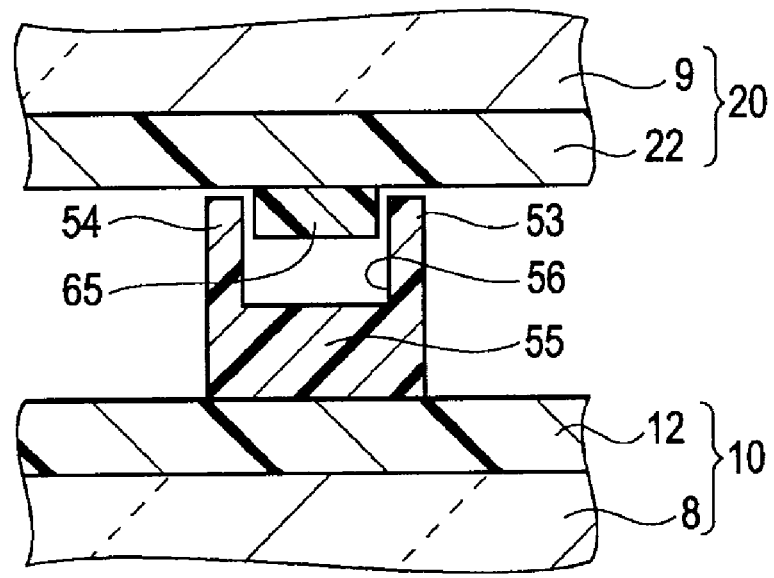
FIG. 21 is a schematic cross-sectional view showing other shapes and combinations of seal guides according to the third embodiment of the invention.

In FIG. 21A, the first substrate 10 includes the first partition wall 53, the second partition wall 54, and the connection portion 55 for connecting the partition walls, and the second substrate 20 includes a seal guide connection portion 65 for closing the groove portion 56.

Figure 21B:
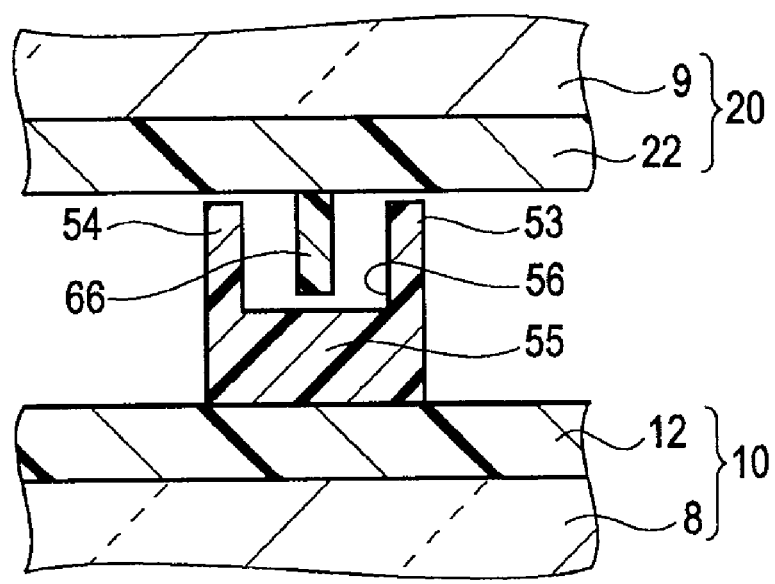

In FIG. 21B, the first substrate 10 includes the first partition wall 53, the second partition wall 54, and the connection portion 55 for connecting the partition walls, and the second substrate 20 includes a partition wall 66 located at the central portion of the groove portion 56.

By such a configuration, since the applied amount of seal material can be reduced and a large adhesion area can be secured, it is possible to improve the adhesion strength between the first substrate 10 and the second substrate 20.

Fourth Embodiment

Liquid Crystal Device 4

Next, a liquid crystal device according to a fourth embodiment will be described. In the present embodiment, unlike the first, second and third embodiments, the embodiment of a vacuum injection method of liquid crystal will be described. The same components as the first embodiment are denoted by the same reference numerals as the first embodiment, and the description thereof will be simplified.

Figure 22A:
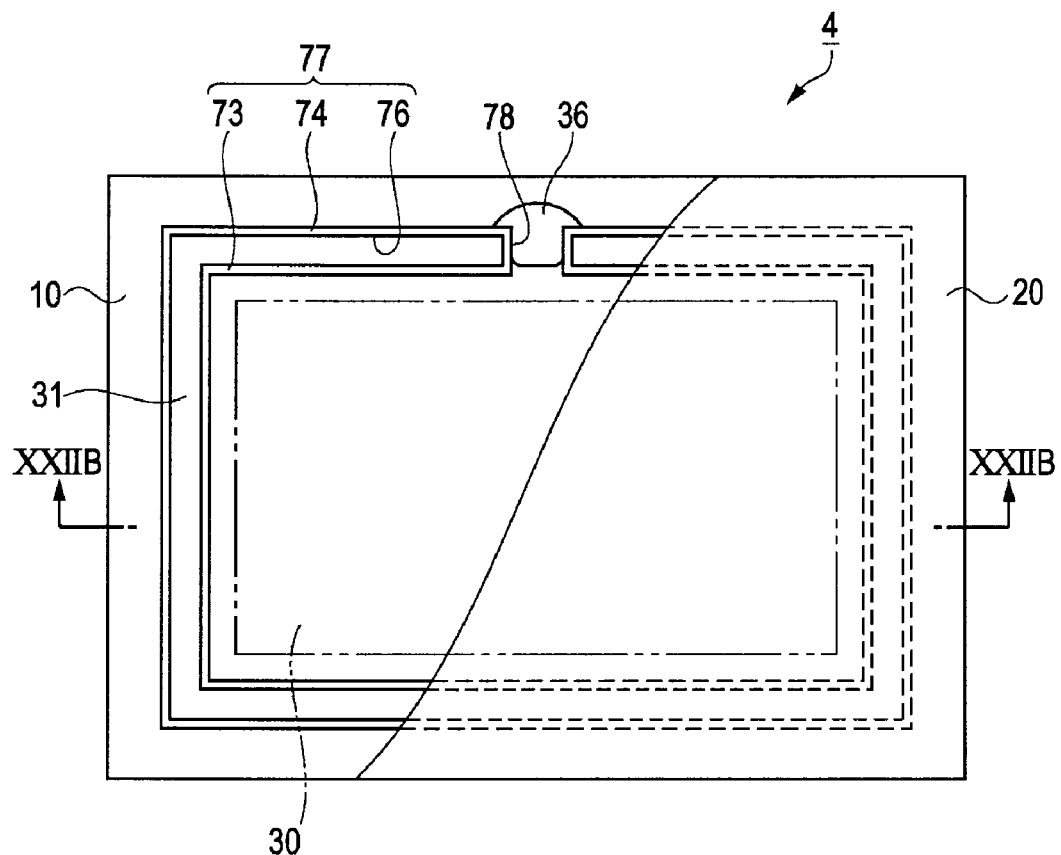
FIG. 22A is a schematic plan view and FIG. 22B is a schematic cross-sectional view taken along line XXIIB-XXIIB of FIG. 22A.
Figure 22B:
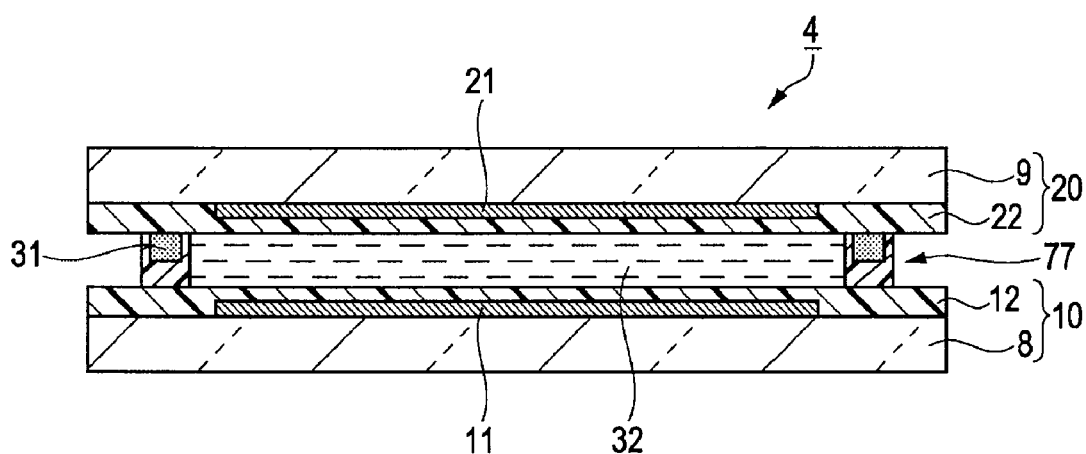
Figure 23:
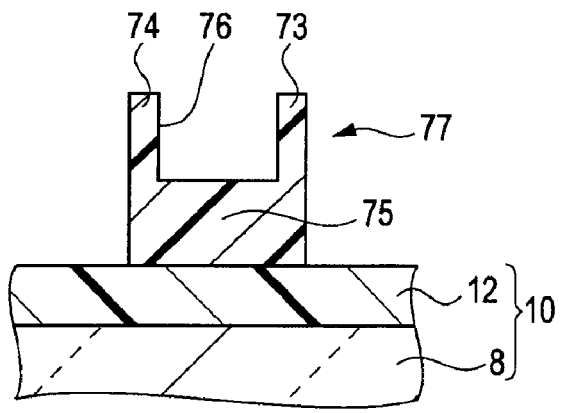
FIG. 23 is a schematic cross-sectional view showing the details of a seal guide according to the fourth embodiment of the invention.

FIG. 22 is a view showing the configuration of the liquid crystal device according to the present embodiment, wherein FIG. 22A is a schematic plan view and FIG. 22B is a schematic cross-sectional view taken along line XXIIB-XXIIB of FIG. 22A. FIG. 23 is a schematic cross-sectional view showing the details of a seal guide.

As shown in FIG. 22, the liquid crystal device 4 is integrated by adhering a first substrate 10 and a second substrate 20 by a seal material 31 with liquid crystal 32 interposed therebetween. The seal material 31 is held by a seal guide 77 provided in the edges of the first substrate 10 in an annular shape.

The first substrate 10 includes a first base material 8, a front electrode 11, an alignment film 12 and so on. The light transmission front electrode 11 is formed on one surface of the first base material 8, and the alignment film 12 for controlling the alignment of the liquid crystal is formed thereon.

Similarly, the second substrate 20 includes a second base material 9, a rear electrode 21, an alignment film 22 and so on. The light transmission rear electrode 21 is formed on one surface of the second base material 9, and the alignment film 22 for controlling the alignment of the liquid crystal is formed thereon.

On the alignment film 12 of the first substrate 10, the seal guide 77 is extended in a thickness direction of the first substrate 10 and is formed along the outer circumference of a display region 30.

The seal guide 77 includes a first partition wall 73, a second partition wall 74 and a connection portion 75. The first partition wall 73 extends in the thickness direction of the first substrate 10 so as to surround the outer circumference of the display region 30. The second partition wall 74 extends in the thickness direction of the first substrate 10 so as to surround the outer circumference of the first partition wall 73. The first partition wall 73 and the second partition wall 74 are formed excluding a liquid crystal injection hole 78, and the first partition wall 73 and the second partition wall 74 are connected at this liquid crystal injection hole 78. The first partition wall 73 and the second partition wall 74 are formed with the same height so as to define a cell gap between both substrates. The connection portion 75 which connects the first partition wall 73 and the second partition wall 74 and is formed with a height lower than such partition walls is provided.

Although the seal guide 77 is formed on the alignment film 12 in the above embodiment, the seal guide 77 may be formed on the first base material 8.

In such a configuration, in the seal guide 77, a groove portion 76 which uses the first partition wall 73 and the second partition wall 74 as sidewalls and uses the connection portion 75 as a bottom is defined. This groove portion 76 has a closed groove shape by connecting the first partition wall 73 and the second partition wall 74 in the liquid crystal injection hole 78. Accordingly, the seal material 31 applied in the groove portion 76 stays in the groove portion 76 such that the seal material does not flow from the seal guide 77 to the outside thereof.

Since the depth of the groove portion 76 can be properly adjusted by adjusting the height of the connection portion 75, the amount of the seal material 31 disposed in the groove portion 76 is set small, and the amount of seal material 31 which overhangs from the first partition wall 73 to the injection side of the liquid crystal 32 can be reduced.

Method of Manufacturing Liquid Crystal Device 4

Next, an example of a method of manufacturing the liquid crystal device 4 according to the present embodiment will be described.

Figure 24:
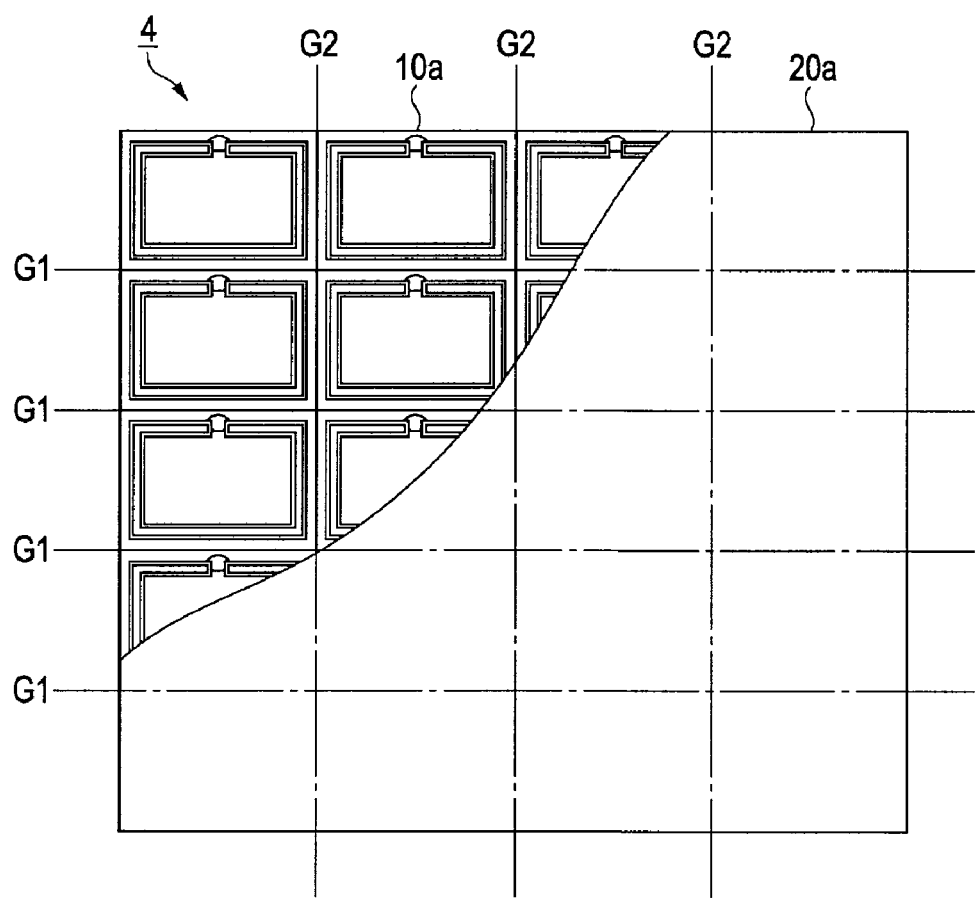
FIG. 24 is an explanation view showing a multiple-production state of the liquid crystal device according to the fourth embodiment of the invention.
Figure 25:
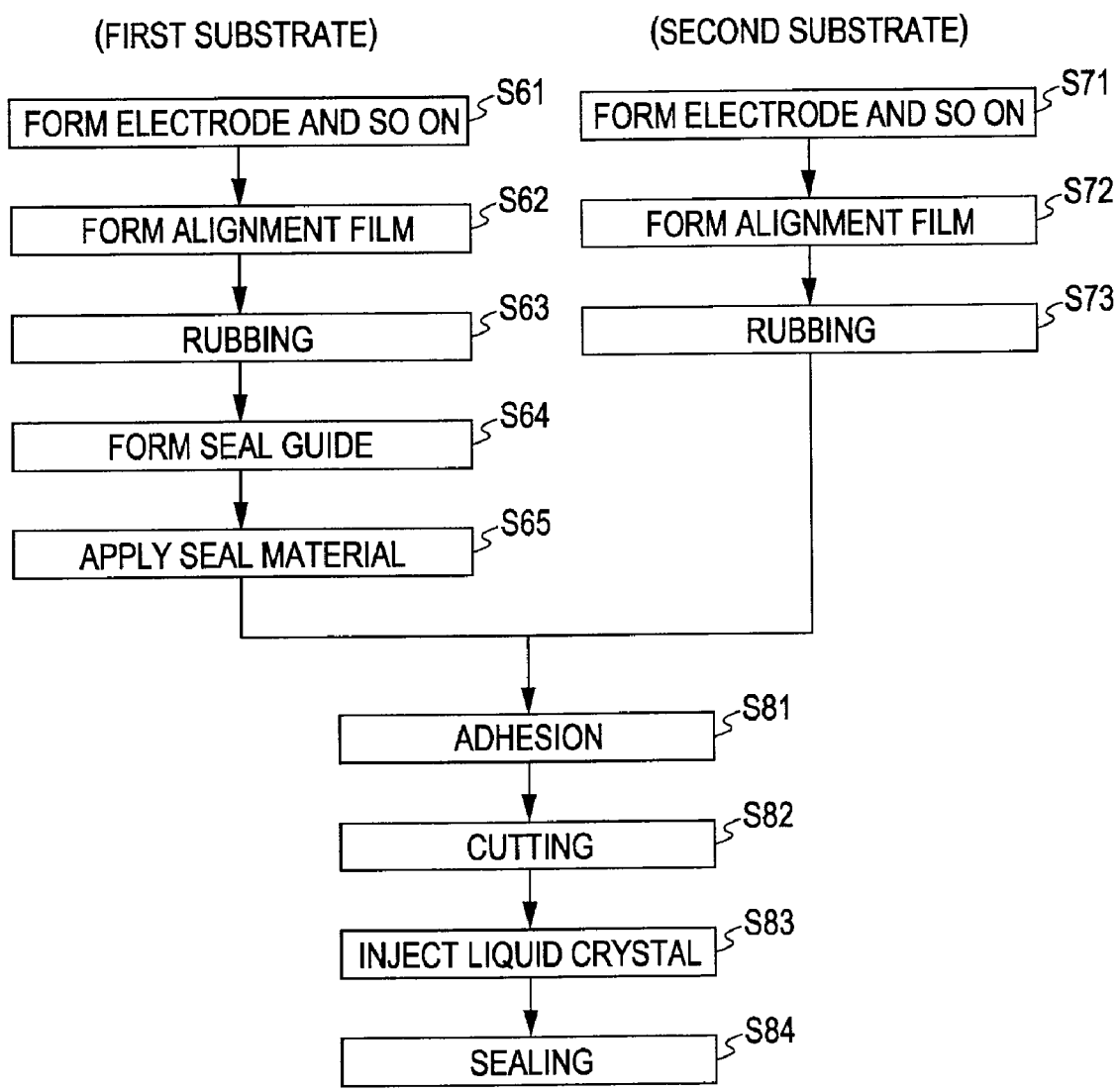
FIG. 25 is a flowchart explaining a method of manufacturing the liquid crystal device according to the fourth embodiment of the invention.

FIG. 24 is an explanation view showing a multiple-production state of the liquid crystal device, FIG. 25 is a flowchart explaining the method of manufacturing the liquid crystal device, and FIGS. 26 and 27 are explanation views explaining the method of manufacturing the liquid crystal device.

As shown in FIG. 24, when the liquid crystal device 4 is manufactured, a multiple-production method of collectively forming a plurality of liquid crystal devices using a large-sized base material called a mother substrate is employed. In this method, in order to produce a plurality of first substrates 10 of the liquid crystal devices 4, a first mother substrate 10a on which electrodes or wires are collectively formed is used and, in order to produce a plurality of second substrates 20 of the liquid crystal devices 4, a second mother substrate 20a on which electrodes or wires are collectively formed is used.

In addition, the first mother substrate 10a and the second mother substrate 20a are adhered to each other with the liquid crystal interposed therebetween and are cut along scribe lines G1 and G2 so as to be divided into the liquid crystal devices 4.

Hereinafter, the manufacturing method will be described in detail using FIGS. 26 and 27 according to the flowchart of FIG. 25. In addition, one of the liquid crystal devices obtained by the multiple production will be shown and described.

Figure 26A:
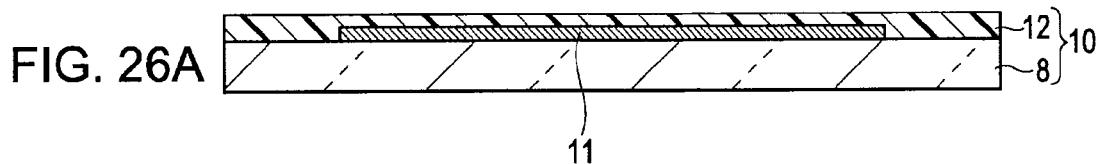
FIG. 26 is an explanation view explaining the method of manufacturing the liquid crystal device according to the fourth embodiment of the invention.

As shown in FIG. 26A, the front electrode 11, a wire and so on are formed on the surface of the first base material 8 (step S61). Next, the alignment film 12 is formed on the front electrode 11 (step S62). Subsequently, a rubbing process is performed with respect to the alignment film 12 (step S63). Accordingly, the first substrate 10 is formed.

Figure 26B:
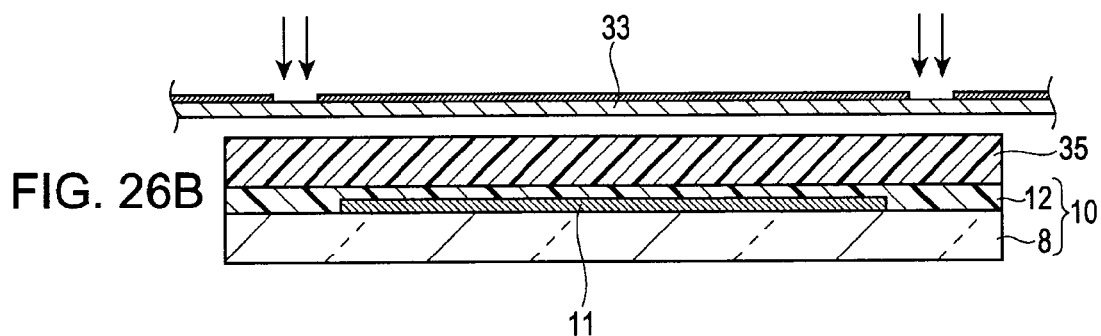

Next, as shown in FIG. 26B, a photosensitive resin film 35 is applied on the alignment film 12 of the first substrate 10. In addition, the photosensitive resin film 35 is exposed using a photomask 33 having an outer shape of the seal guide.

Figure 26C:
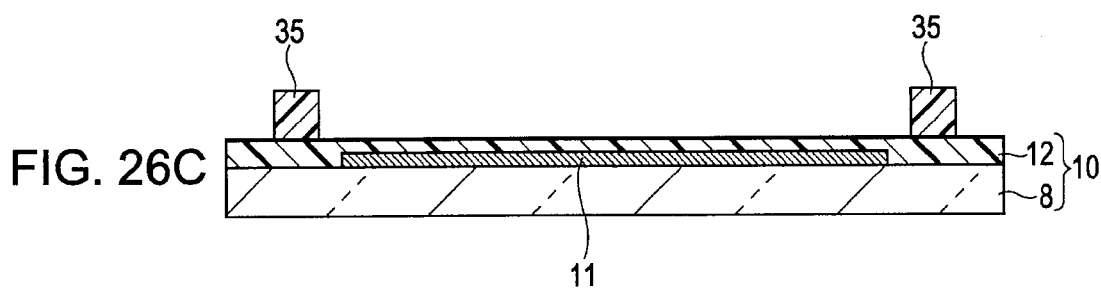

Thereafter, as shown in FIG. 26C, the photosensitive resin film 35 is developed so as to form a structure having the outer shape of the seal guide.

Figure 26D:
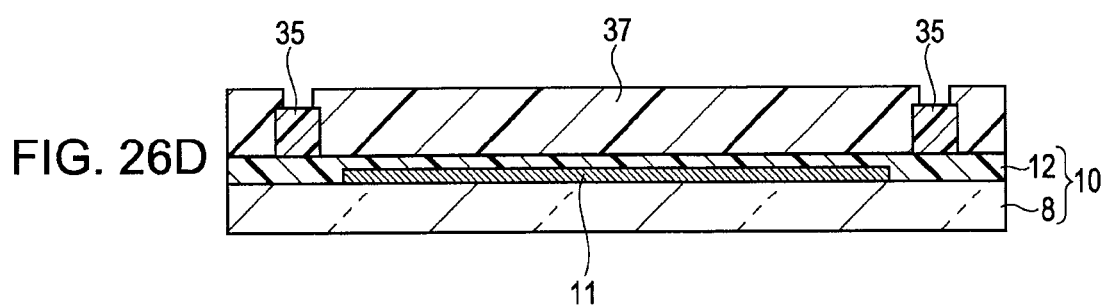

Subsequently, as shown in FIG. 26D, a resist film 37 is applied and is patterned in the shape of the groove portion of the seal guide.

Figure 26E:
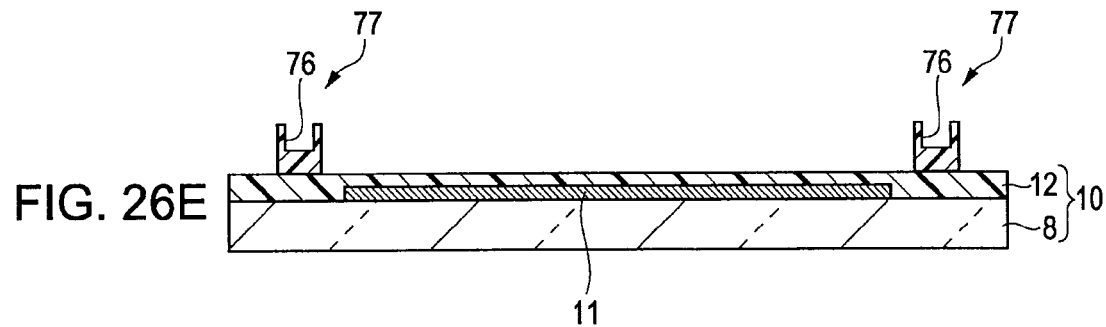

In addition, the photosensitive resin film 35 is half-etched using the resist film 37 as a mask so as to form the groove portion 76, the resist film 37 is removed, and the seal guide 77 shown in FIG. 26E is formed (step S64).

In addition, the seal guide 77 may be formed using a multi-level gradation exposure technique. In this case, the seal guide 77 can be collectively formed although the process of forming the groove portion 76 is not provided. In addition, the seal guide 77 may be formed by thermoplastic resin, photosensitive resin or the like using a nano-imprint technique. In addition, the rubbing process may be performed after the seal guide 77 is formed.

Figure 27A:
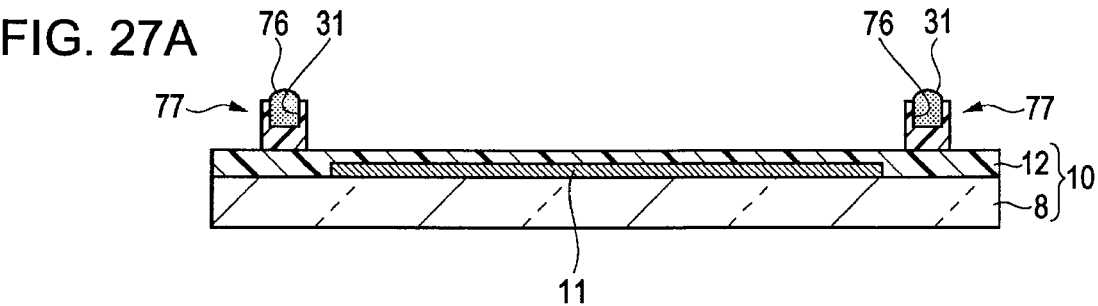
FIG. 27 is an explanation view explaining the method of manufacturing the liquid crystal device according to the fourth embodiment of the invention.

Next, as shown in FIG. 27A, the seal material 31 formed of ultraviolet curing epoxy resin is applied on the annular groove portion 76 of the seal guide 77 (step S65). The seal material 31 is disposed in the groove portion 76 using a dispenser with one stroke without disconnection.

Although not shown, the second substrate 20 is formed by the same process as the first substrate 10. That is, the rear electrode 21, a wire and so on are formed on the surface of the second base material 9 (step S71). Next, the alignment film 22 is formed on the rear electrode 21 (step S72). Subsequently, a rubbing process is performed with respect to the alignment film 22 (step S73). Accordingly, the second substrate 20 is formed.

Figure 27B:
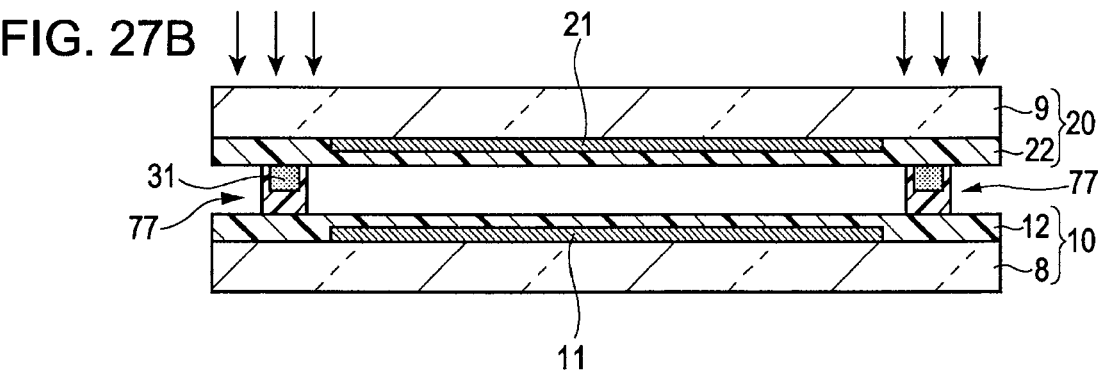

Next, as shown in FIG. 27B, the second substrate 20 is laid on the first substrate 10. Ultraviolet rays are irradiated onto a portion in which the seal material 31 is disposed from the upper side of the second substrate 20. Accordingly, the seal material 31 is cured and the first substrate 10 and the second substrate 20 are adhered (step S81). Thus, a cell in which a liquid injection hole is opened is formed.

Next, the adhered multiple-production mother substrate is cut so as to be divided into individual liquid crystal device units (step S82).

Figure 27C:
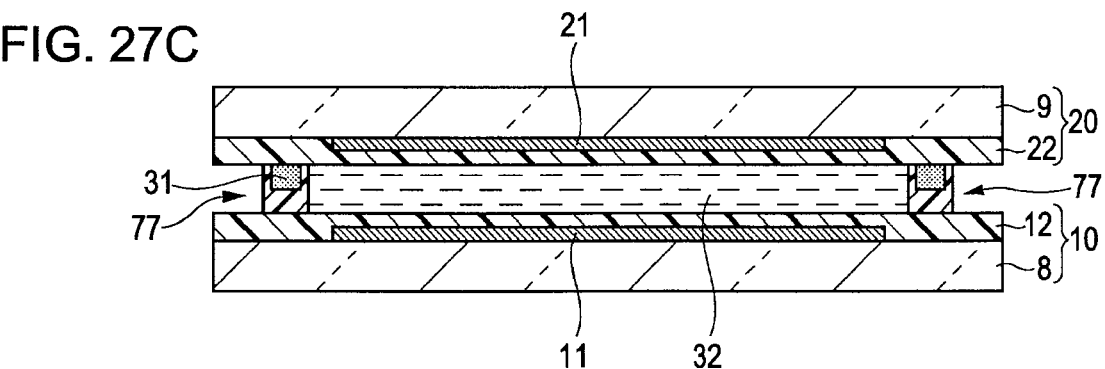

Next, as shown in FIG. 27C, the inside of the cell formed between the first substrate 10 and the second substrate 20 is depressurized, the liquid injection hole is immersed in the liquid level of the liquid crystal, and the liquid crystal 32 is injected into the cell (step S83).

Figure 27D:
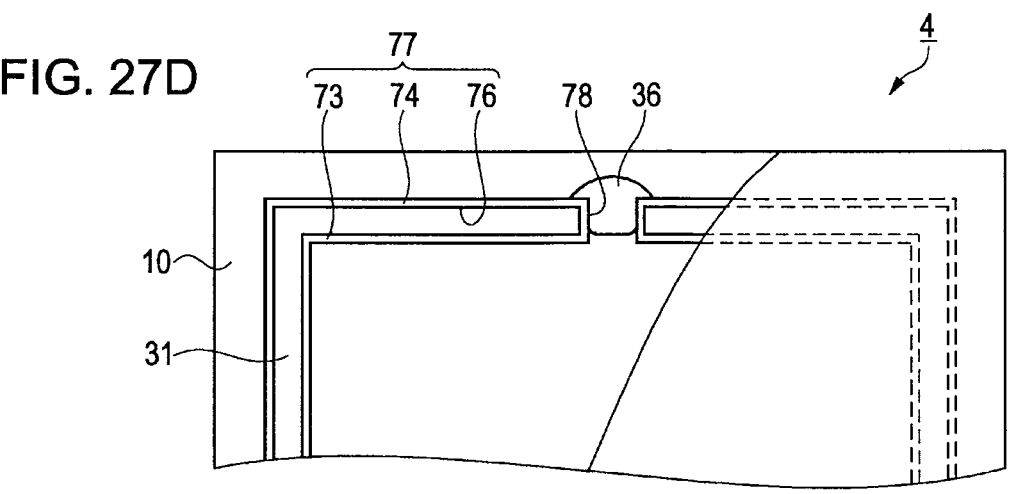

Thereafter, as shown in FIG. 27D, the liquid injection hole 78 is sealed using the seal material 36 such as photo curing epoxy resin, photo curing acrylic resin, or the like (step S84). Accordingly, the liquid crystal device 4 is manufactured.

In addition, after the step S84, cleaning is performed, polarization plates are mounted on the surfaces of the first base material 8 and the second base material 9, and a liquid crystal driving IC is mounted with a FPC or the like interposed therebetween, thereby configuring the liquid crystal device.

According to the liquid crystal device 4 of the present embodiment, the seal guide 77 formed on the first substrate 10 includes the first partition wall 73, the second partition wall 74, and the connection portion 75, the seal material 31 is disposed in the groove portion 76 defined by the first partition wall 73, the second partition wall 74 and the connection portion 75, and the first substrate 10 and the second substrate 20 are adhered.

Since the connection portion 75 for connecting the first partition wall 73 and the second partition wall 74 is formed, the groove portion 76 in which the seal material 31 is disposed becomes shallow. Accordingly, it is possible to reduce the disposed amount of seal material 31 and to reduce the amount of seal material 31 which overhangs from the first partition wall 73 to the injection side of the liquid crystal 32.

Accordingly, since the amount of seal material 31 which overhangs to the injection side of the liquid crystal 32 is reduced and the elution of resin or additive components contained in the seal material due to the contact with the liquid crystal is remarkably reduced, the deterioration of the display quality of the liquid crystal device, such as display unevenness, alignment abnormality or the like, can be prevented.

Since the seal material 31 can be disposed in the groove portion 76, the seal material 31 does not flowing out of the groove portion 76, and the seal material 31 formed of photo curing resin, thermosetting resin, or photo-thermosetting resin may be used without depending on the viscosity of the seal material 31. Accordingly, the selection range of the seal material 31 is increased and a seal material suitable for the use may be used.

The liquid crystal devices according to the first to fourth embodiments may be used in any one of a transmissive type, reflective type or translucent type liquid crystal device.

Fifth Embodiment

Electronic Apparatus

Figure 28A:
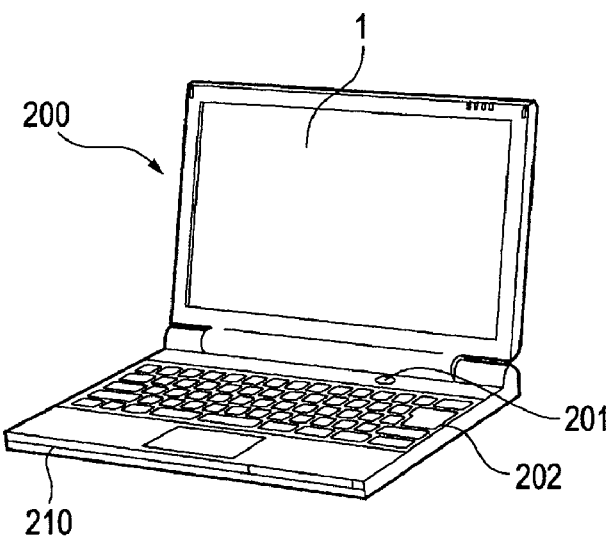
FIG. 28 is an explanation view showing an electronic apparatus according to a fifth embodiment of the invention.
Figure 28B:
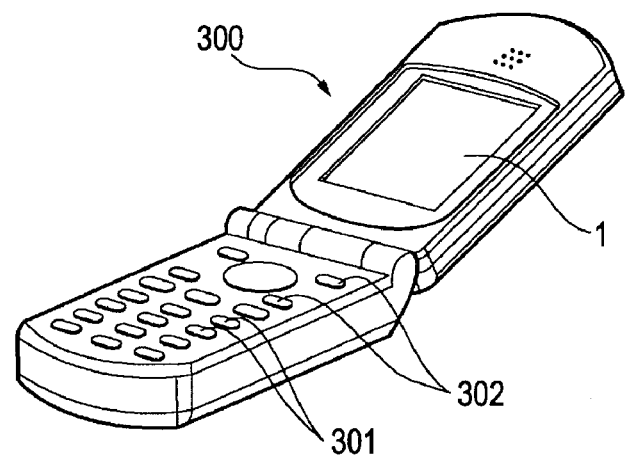
Figure 29:
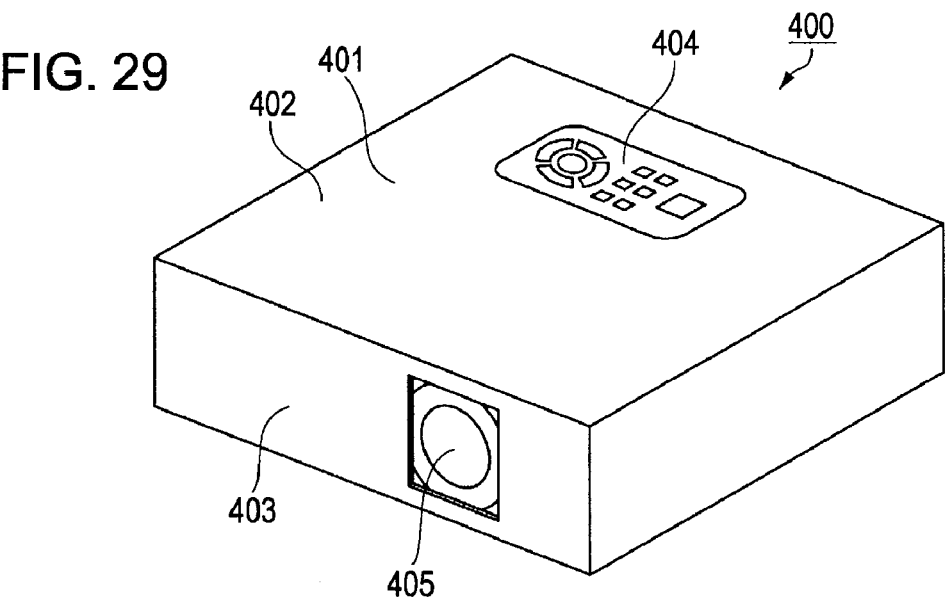
FIG. 29 is an explanation view showing the electronic apparatus according to the fifth embodiment of the invention.

Each of the above-described liquid crystal devices 1 to 4 may be employed in a display unit of each of electronic apparatuses shown in FIGS. 28 and 29, for example.

FIG. 28A shows the configuration of a mobile personal computer 200 including the liquid crystal device 1. The personal computer 200 includes the liquid crystal device 1 and a main body 210. In the main body 210, a power switch 201 and a keyboard 202 are provided.

FIG. 28B shows the configuration of a mobile telephone 300 including the liquid crystal device 1. The mobile telephone 300 includes a plurality of operation buttons 301, a scroll button 302, and the liquid crystal device 1 as a display unit. By operating the scroll button 302, the screen displayed by the liquid crystal device 1 is scrolled.

FIG. 29 shows the configuration of a projector 400 including the liquid crystal device 1. The projector 400 has a configuration in which a device main body is surrounded by a casing body 401, and a projection lens 405 for projecting an image (image light) onto an external screen or the like is exposed in the front surface 403 of the casing body 401. On the upper surface 402 of the casing body 401, an operation panel 404 for allowing a user to perform an input operation is provided. In addition, the liquid crystal device (not shown) is employed in the casing body 401 as a light valve for emitting the image light.

Each of such electronic apparatuses includes the liquid crystal device capable of preventing the deterioration of the display quality of the liquid crystal device, such as display unevenness, alignment abnormality or the like. Accordingly, it is possible to provide an electronic apparatus with excellent display quality.

The examples of the electronic apparatus may include a digital camera, a digital video camera, an audio instrument, a liquid crystal TV set, a car navigation system, and so on.

The entire disclosure of Japanese Patent application No. 2008-177604, field Jul. 8, 2008 is expressly incorporated by reference herein.

What is claimed is:

1. A liquid crystal device including a display region, the liquid crystal device comprising:
   a first substrate and a second substrate facing each other;
   liquid crystal sandwiched between the first substrate and the second substrate;
   a seal guide disposed on the first substrate at a position between the first substrate and the second substrate side, and the seal guide including:
   a first partition wall disposed following the outer circumference of the display region, the first partition wall having one wall surface and an other wall surface on opposite sides thereof, the one wall surface being adjacent to the liquid crystal;
   a second partition wall disposed to the outside of the first partition wall, the second partition wall having a wall surface which faces the other wall surface of the first partition wall; and
   a connection portion having a height lower than the height of the first partition wall and lower than the height of the second partition wall, the connection portion being disposed between the first partition wall and the second partition wall and connecting the first partition wall and the second partition wall; and
   a seal material disposed between the first partition wall and the second partition wall and on the connection portion, the seal material adhering the first substrate and the second substrate together.

2. The liquid crystal device according to claim 1, wherein a concave groove portion is configured by the first partition wall, the second partition wall and the connection portion, a surface configuring the groove portion of the connection portion is recessed toward the first substrate in an arc shape.

3. The liquid crystal device according to claim 1, wherein a concave groove portion is configured by the first partition wall, the second partition wall and the connection portion, irregularities are formed in a surface configuring the groove portion of the connection portion.

4. The liquid crystal device according to claim 1, wherein a concave groove portion is configured by the first partition wall, the second partition wall and the connection portion, the groove portion is formed in an annular shape.

5. The liquid crystal device according to claim 1, wherein the seal material is formed of a material selected from photo curing resin, thermosetting resin or photo-thermosetting resin.

6. The liquid crystal device according to claim 1, wherein the first partition wall, the second partition wall and the connection portion are formed of a material selected from photo curing resin, thermosetting resin or photo-thermosetting resin.

7. The liquid crystal device according to claim 6, wherein the material of the first partition wall, the second partition wall and the connection portion includes a light absorption agent or a coloring pigment.

8. A liquid crystal device including a display region, the liquid crystal device comprising:
   a first substrate and a second substrate facing each other;
   liquid crystal sandwiched between the first substrate and the second substrate;
   a first partition wall disposed on the first substrate at a position between the first substrate and the second substrate, the first partition wall being disposed following the outer circumference of the display region, the first partition wall having one wall surface and an other wall surface on opposite sides thereof, the one wall surface being adjacent to the liquid crystal;
   a second partition wall disposed on the first substrate at a position between the first substrate and the second substrate, the second partition wall disposed to the outside of the first partition wall, the second partition wall having a wall surface which faces the other wall surface of the first partition wall, the second partition wall having at least a portion with a height lower than a height of the first partition wall; and
   a seal material disposed between the first partition wall and the second partition wall, the seal material adhering the first substrate and the second substrate together.

9. The liquid crystal device according to claim 8, further comprising a connection portion which connects the first partition wall and the second partition wall.

10. The liquid crystal device according to claim 8, wherein a groove portion, in which the seal material is filled, is formed in an annular shape.

11. The liquid crystal device according to claim 8, wherein the seal material is formed of a material selected from photo curing resin, thermosetting resin or photo-thermosetting resin.

12. The liquid crystal device according to claim 8, wherein the first partition wall and the second partition wall are formed of a material selected from photo curing resin, thermosetting resin or photo-thermosetting resin.

13. The liquid crystal device according to claim 12, wherein the material of the first partition wall and the second partition wall includes a light absorption agent or a coloring pigment.

14. A liquid crystal device including a display region, the liquid crystal device comprising:
   a first substrate and a second substrate facing each other;
   liquid crystal sandwiched between the first substrate and the second substrate;
   a first partition disposed following the outer circumference of the display region and extending from one surface of the first substrate in the thickness direction of the first substrate;
   a second partition wall disposed to the outside of the first partition wall and extending from one surface of the first substrate in the thickness direction of the first substrate;
   a seal material disposed between the first partition wall and the second partition wall, the seal material adhering the first substrate and the second substrate together; and
   a third partition wall disposed following the first partition wall and extending from one surface of the second substrate in the thickness direction of the second substrate, the third partition wall having a wall surface adjacent to the liquid crystal or adjacent to the seal material.

15. The liquid crystal device according to claim 14, wherein the wall surface of the third partition wall is disposed so as to be in contact with the wall surface of the first partition wall.

16. The liquid crystal device according to claim 15, further comprising a fourth partition wall which is extended from one surface of the second substrate in the thickness direction of the second substrate and is formed along the outer circumference of the third partition wall,
   wherein, at the adhesion position of the first substrate and the second substrate, the fourth partition wall is disposed at a position which is in contact with the second partition wall.

17. A liquid crystal device including a display region, the liquid crystal device comprising:
   a first substrate and a second substrate facing each other;
   liquid crystal sandwiched between the first substrate and the second substrate;
   a first partition wall disposed on the first substrate at a position between the first substrate and the second substrate, the first partition wall disposed following the outer circumference of the display region, the first partition wall having one wall surface and an other wall surface on opposite sides thereof, the one wall surface being adjacent to the liquid crystal;
   a second partition wall disposed on the first substrate at a position between the first substrate and the second substrate, the second partition wall disposed to the outside of the first partition wall, the second partition wall having a wall surface which faces the other wall surface of the first partition wall;
   a connection portion disposed on the second substrate at a position between the first substrate and the second substrate, the connection portion being disposed between the other wall surface of the first partition wall and the wall surface of the second partition wall that faces the other wall surface; and
   a seal material disposed between the first partition wall and the second partition, the seal material adhering the first substrate and the second substrate together.

18. The liquid crystal device according to claim 17, wherein the connection portion being disposed so as to cover a gap between the other wall surface of the first partition wall and the wall surface of the second partition wall facing the other wall surface.

19. The liquid crystal device according to claim 14, wherein a groove portion, in which the seal material is filled, is formed in an annular shape.

20. The liquid crystal device according to claim 14, wherein the seal material is formed of a material selected from photo curing resin, thermosetting resin or photo-thermosetting resin.

21. The liquid crystal device according to claim 14, wherein the first partition wall and the second partition wall are formed of a material selected from photo curing resin, thermosetting resin or photo-thermosetting resin.

22. The liquid crystal device according to claim 21, wherein the material of the first partition wall and the second partition wall includes a light absorption agent or a coloring pigment.

23. An electronic apparatus comprising the liquid crystal device according to claim 1.

* * * * *